(12) United States Patent
Boucadair et al.

(10) Patent No.: US 12,531,829 B2
(45) Date of Patent: Jan. 20, 2026

(54) METHOD AND DEVICE FOR OBTAINING AN IP ADDRESS

(71) Applicant: Orange, Issy-les-Moulineaux (FR)

(72) Inventors: Mohamed Boucadair, Chatillon (FR); Christian Jacquenet, Chatillon (FR)

(73) Assignee: Orange, Issy-les-Moulineaux (FR)

(*) Notice: Subject to any disclaimer, the term of this patent is extended or adjusted under 35 U.S.C. 154(b) by 0 days.

(21) Appl. No.: 17/619,850

(22) PCT Filed: Jun. 18, 2020

(86) PCT No.: PCT/FR2020/051057
§ 371 (c)(1),
(2) Date: Dec. 16, 2021

(87) PCT Pub. No.: WO2020/254766
PCT Pub. Date: Dec. 24, 2020

(65) Prior Publication Data
US 2022/0311734 A1 Sep. 29, 2022
US 2024/0430226 A2 Dec. 26, 2024

(30) Foreign Application Priority Data

Jun. 20, 2019 (FR) ...................... 1906673

(51) Int. Cl.
*H04L 61/4511* (2022.01)
*H04L 61/251* (2022.01)
(Continued)

(52) U.S. Cl.
CPC ........ *H04L 61/251* (2013.01); *H04L 61/4511* (2022.05); *H04L 2101/659* (2022.05); *H04L 2101/686* (2022.05)

(58) Field of Classification Search
CPC ............... H04L 63/253; H04L 63/6515; H04L 2303/686
(Continued)

(56) References Cited

U.S. PATENT DOCUMENTS 7,764,686 B1 * 7/2010 Toebes .................. H04L 61/251
370/392
7,917,616 B2 * 3/2011 Trace .................. H04L 61/4511
709/224
(Continued)

FOREIGN PATENT DOCUMENTS

AU 2004241546 A1 * 12/2004 .......... H04L 61/4511
CA 2507529 C * 3/2011 .......... H04L 12/4633
(Continued)

OTHER PUBLICATIONS

J.P. Martinez, The IPV6 Company, "Additional Deployment Guidelines for NAT64/464XLAT in Operator and Enterprise Networks; draft-ietf-v6ops-nat64-deployment-06.txt", May 4, 2019, p. 1-43; Retrieved from the Internet: URL:https://tools.ietf.org/html/draft-ietf-v6ops-nat64-deployment-06. (Year: 2019).*
(Continued)

*Primary Examiner* — Khanh Q Dinh
(74) *Attorney, Agent, or Firm* — David D. Brush; Westman, Champlin & Koehler, P.A.

(57) ABSTRACT

A method for a client device to obtain an IP address in order to access a network resource via at least one IP network. The method includes: inserting, in a request for obtaining an IPv6 address in order to access the network resource intended for a DNS server, a piece of information representing an IP address type expected by the client device of the DNS server in response to the obtaining request if the network resource has an IPv4 connectivity; and sending the obtaining request to the DNS server.

17 Claims, 5 Drawing Sheets

(51) Int. Cl.
  *H04L 101/659* (2022.01)
  *H04L 101/686* (2022.01)
(58) Field of Classification Search
  USPC .......................................... 709/203, 220–228
  See application file for complete search history.

(56) References Cited

U.S. PATENT DOCUMENTS

| | | | | |
|---|---|---|---|---|
| 8,762,554 | B2* | 6/2014 | Trace | H04L 63/0428 |
| | | | | 709/217 |
| 9,686,240 | B1* | 6/2017 | Ray | H04L 45/741 |
| 11,153,330 | B1* | 10/2021 | Antoniewicz | H04L 63/20 |
| 11,457,079 | B1* | 9/2022 | Mehta | H04L 67/133 |
| 2006/0236325 | A1* | 10/2006 | Rao | H04W 4/50 |
| | | | | 455/424 |
| 2010/0034381 | A1* | 2/2010 | Trace | H04L 61/58 |
| | | | | 709/227 |
| 2010/0036959 | A1* | 2/2010 | Trace | H04L 63/0428 |
| | | | | 709/228 |
| 2013/0007870 | A1* | 1/2013 | Devarajan | H04L 63/1416 |
| | | | | 726/11 |
| 2013/0080649 | A1* | 3/2013 | Trace | H04L 63/0428 |
| | | | | 709/229 |
| 2013/0212240 | A1* | 8/2013 | Thornewell | H04L 61/4511 |
| | | | | 709/223 |
| 2014/0173134 | A1* | 6/2014 | Choquette | H04L 61/4511 |
| | | | | 709/245 |
| 2014/0258491 | A1* | 9/2014 | Forristal | H04L 61/2592 |
| | | | | 709/223 |
| 2015/0215267 | A1* | 7/2015 | Kagan | H04L 61/4511 |
| | | | | 709/245 |
| 2016/0036943 | A1* | 2/2016 | Kish | H04L 61/4511 |
| | | | | 709/203 |
| 2016/0308818 | A1* | 10/2016 | Torres | H04L 45/741 |
| 2016/0344688 | A1* | 11/2016 | Lakhera | H04L 61/4511 |
| 2017/0034125 | A1* | 2/2017 | Wang | H04L 61/256 |
| 2018/0048564 | A1* | 2/2018 | Bianco | H04L 61/4511 |
| 2020/0196135 | A1* | 6/2020 | Mudric | H04L 69/167 |
| 2020/0358878 | A1* | 11/2020 | Bansal | H04L 63/0236 |
| 2021/0067482 | A1* | 3/2021 | Jiménez | H04L 61/4511 |
| 2022/0140996 | A1* | 5/2022 | Cebere | H04L 9/008 |
| | | | | 713/159 |
| 2022/0208319 | A1* | 6/2022 | Ansari | H04L 9/30 |

FOREIGN PATENT DOCUMENTS

| | | |
|---|---|---|
| CN | 102739809 A | 10/2012 |
| FR | 3023098 A1 | 1/2016 |

OTHER PUBLICATIONS

International Search Report dated Oct. 15, 2020 for corresponding International Application No. PCT/FR2020/051057, Jun. 20, 2020.
Written Opinion of the International Searching Authority dated Oct. 26, 2020 for corresponding International Application No. PCT/FR2020/051057, filed Jun. 20, 2020.
M. Bagnulo et al., "Stateful NAT64: Network Address and Protocol Translation from IPV6 Clients to IPv4 Servers", RFC 6146, Apr. 2011.
C. Bao et al., "IPv6 Addressing of IPv4/IPv6 Translators", RFC 6052, Oct. 2010.
S. Thomson et al., "DNS Extensions to Support IP Version 6", IETF RFC3596, Oct. 2003.
M. Boucadair, "Discovering NAT64 IPv6 Prefixes Using the Port Control Protocol (PCP)", RFC 7225, May 2014.
T. Narten et al., "Neighbor Discovery for IP version 6 (IPv6)", RFC 4861, Sep. 2007.
P. Mockapetris, "Domain names—concept and facilities", IETF RFC 1034, Nov. 1987.
Marcelo Bagnulo et al., "The NAT64/DNS64 tool suite for IPv6 transition", IEEE Communications Magazine, IEEE Service Center, Piscataway, US, vol. 50, No. 7, Jul. 1, 2012 (Jul. 1, 2012), p. 177-183, XP011449622.
P. Mockapetris, "Domain names—implementation and specification", IETF RFC 1035, Nov. 1987.
Korhonen J et al, "Analysis of solution proposals for hosts to learn NAT64 prefix; draft-korhonen-behave-nat64-earn-analysis-00.txt", Analysis of Solution Proposals for Hosts to Learn NAT64 Prefix; draft- korhonen-behave-nat64-learn-analysis-00.txt, Internet Engineering Task Force, IETF; Standardworkingdraft, Internet Society (ISOC) 4, Rue Des Falaises CH-1205 Geneva, Switzerland, Nov. 2013, p. 1-24, XP015071744.
Mawatari Japan Internet Exchange Co M et al, "464xlat: Combination of Stateful and Stateless Translation; draft-ietf-v6ops-464xlat-06.txt", 464xlat: Combination of Stateful and Stateless Translation; Draft-ietf-v6ops-464xlat-06.Txt, Internet Engineering Task Force, IETF; Standardworkingdraft, Internet Society (ISOC) 4, Rue Des Falaises CH-1205 Geneva, Switzerland, Apr. 2013, p. 1-19, XP015086774.
Boucadair France Telecom M, "Learn NAT64 PREFIX64s using PCP; draft-ietf-pcp-nat64-prefix64-00.txt", Learn NAT64 PREFIX64S Using PCP; draft-ietf-pcp-nat64-prefix64-00.txt, Internet Engineering Task Force, IETF; Standardworkingdraft, Internet Society (ISOC) 4, Rue Des Falaises CH-1205 Geneva, Switzerland, Sep. 12, 2012, p. 1-10, XP015089952.
Palet Martinez the IPV6 Company J, "Additional NAT64/464XLAT Deployment Guidelines in Operator and Enterprise Networks; draft-ietf-v6ops-nat64-deployment-06.txt", No. 6, Jul. 11, 2019, p. 1-43, Additional NAT64/464XLAT Deployment Guidelines in Operator and Enterprise Networks; draft-ietf-v6ops-nat64-deployment-06.txt; Internet-Draft: V6OPS, Internet Engineering Task Force, IETF; Standardwork.

* cited by examiner

[Fig. 1]
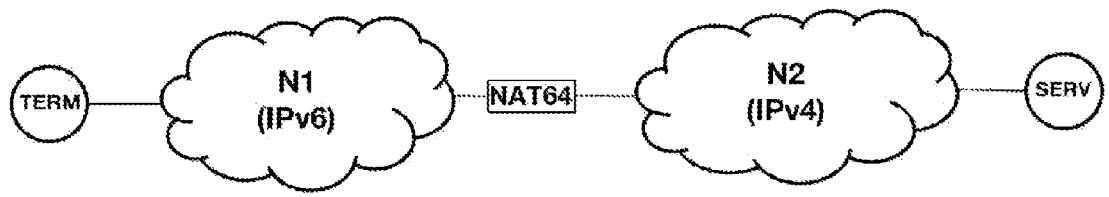
[Fig. 2]
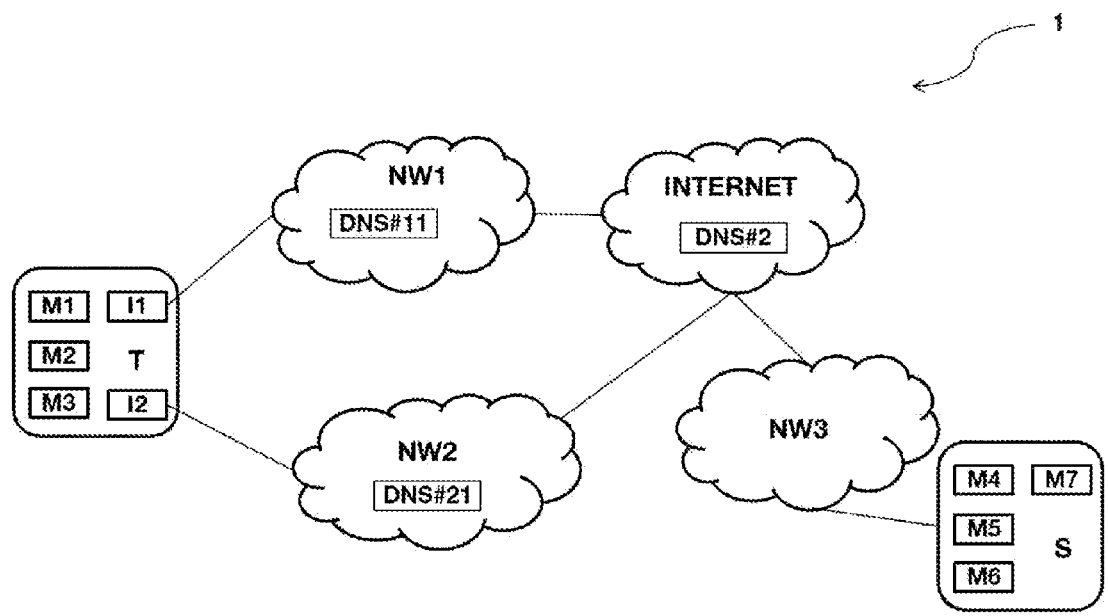
[Fig. 3]
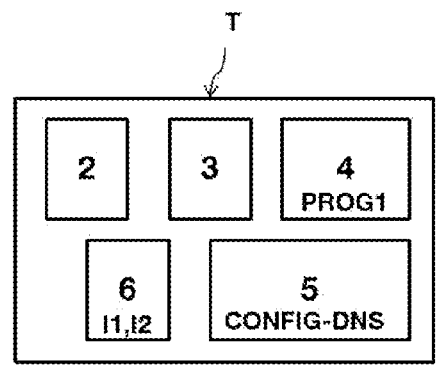

[Fig. 4]
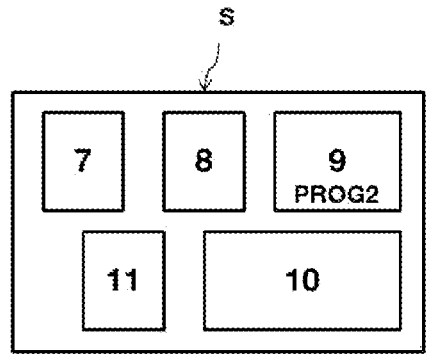
[Fig. 5]
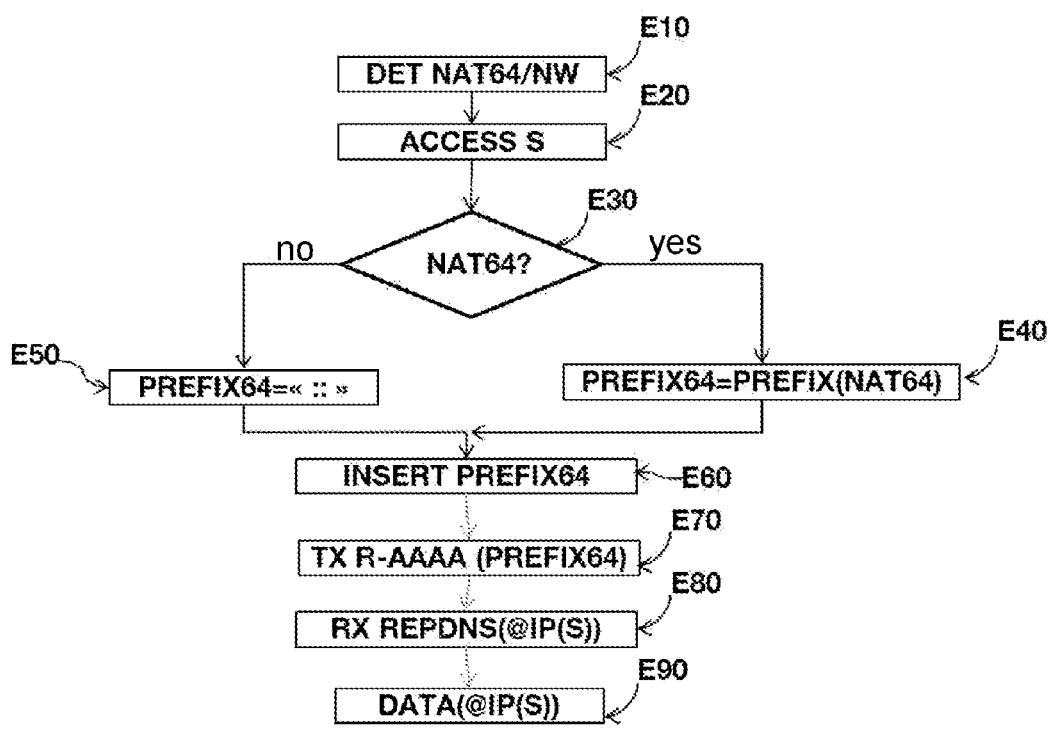

[Fig. 6]
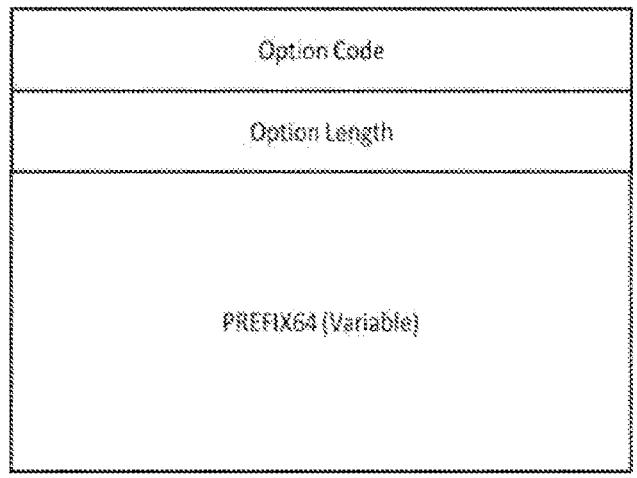
[Fig. 7]
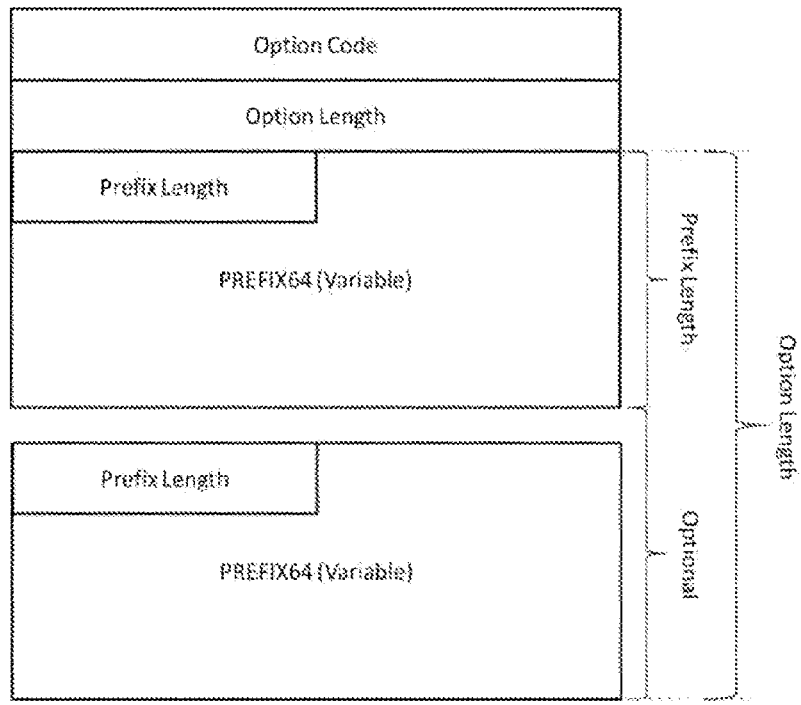

[Fig. 8]
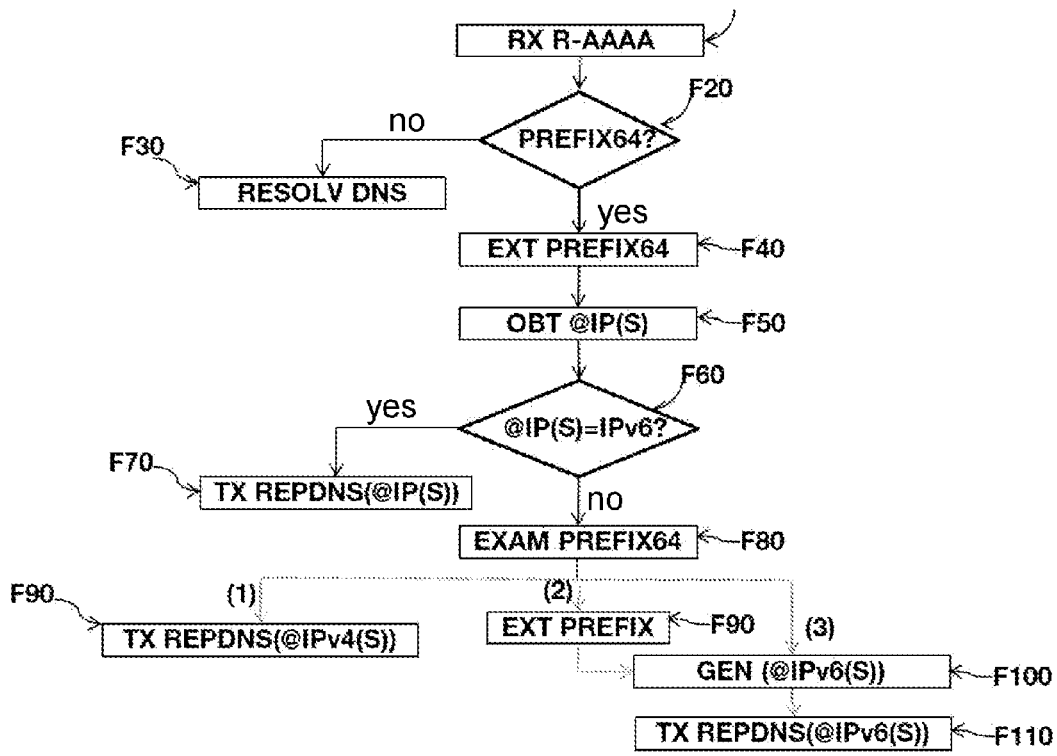
[Fig. 9]
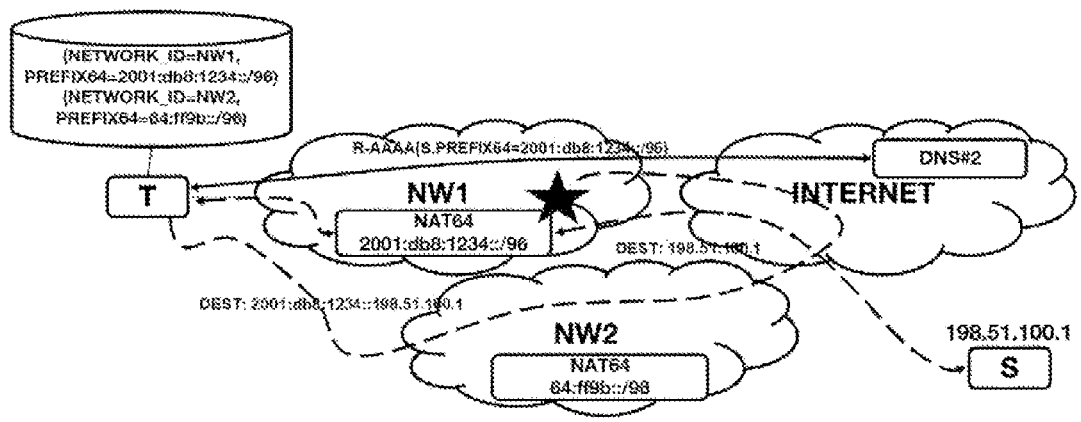

[Fig. 10]
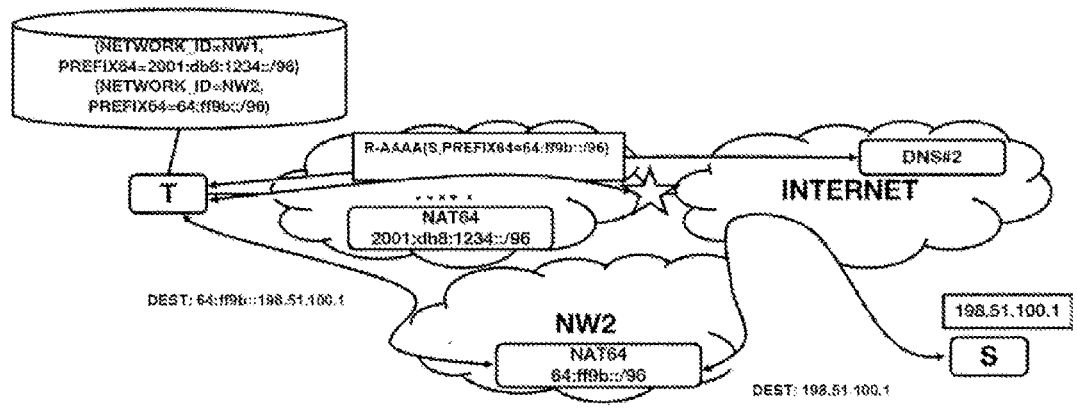

METHOD AND DEVICE FOR OBTAINING AN IP ADDRESS

CROSS-REFERENCE TO RELATED APPLICATIONS

This Application is a Section 371 National Stage Application of International Application No. PCT/FR2020/051057, filed Jun. 18, 2020, which is incorporated by reference in its entirety and published as WO 2020/254766 A1 on Dec. 24, 2020, not in English.

PRIOR ART

The present invention relates to the general field of telecommunications and more particularly to value-added IP (Internet Protocol) services.

IP networks have become the federating networks for a multitude of services and applications. To anticipate the increasing needs in terms of IP addresses, the operators, the network equipment constructors and universities have collaborated to specify the new version of the IP protocol, designated IPv6 (Internet Protocol version 6). The IPv6 specifications have now reached sufficient maturity. Thus, IPv6 is the subject of an operational deployment in most of the networks operated by the operators. Nevertheless, the introduction of this new version of the IP protocol raises problems of interoperability and of interworking with the IPv4 version by construction.

IPv4 still remains mostly used on the Internet (approximately 75% of the traffic), but the reservoir of IPv4 addresses has now run dry. It should not be forgotten that the IPv4 addresses are coded on 32 bits (compared to 128 bits for the IPv6 addresses). The exhaustion of the IPv4 addresses therefore makes the deployment of IPv6 a major issue for the operators and providers of IP services.

Putting in place a migration strategy is however complicated by two major constraints:

the need to guarantee the continuity of the IPv4 services during the period of transition despite the inability to supply a public IPv4 address to each client; and the incompatibility between the IPv4 and IPv6 protocols which complicates the interconnection of the two worlds.

Furthermore, the operators and providers of services must also take account of various constraints for the introduction of IPv6 in the networks and the service infrastructures, but also design new architectures exploiting the new intrinsic functions of IPv6.

The activation of IPv6 should not therefore be seen as the putting in place of an Internet network parallel to the IPv4 Internet network but be conceived as an evolution of the current Internet network. Now, in a context in which both IPv4 and IPv6 protocols coexist, the communications between heterogeneous nodes that have only a single IP stack (that is to say either an IPv4 stack, or an IPv6 stack) and therefore a single type of IPv4 or IPv6 connectivity, must in particular be supported. Furthermore, the protocol version used for establishing a given session must ideally be transparent for the final user. It should be noted that a node which has only a single IP stack, that is to say only an IPv4 stack (the node is then said to be IPv4-only) or only an IPv6 stack (the node is then said to be IPv6-only), is capable of sending, receiving or processing only packets that conform to the protocol version implemented by that IP stack, in other words only packets that conform to the IPv4 protocol for an IPv4-only node or only packets that conform to the IPv6 protocol for an IPv6-only node.

IPv4-IPv6 interconnection mechanisms must therefore be deployed to ensure global connectivity. The overall accessibility does not concern only the destinations that have an address belonging to the same family of addresses (IPv4 or IPv6) as that of the source, but also the destinations belonging to heterogeneous domains (that is to say any destination that has an IPv4 address or an IPv6 address).

Knowing that the IPv6 protocol is not compatible with the IPv4 protocol, the network operators who have opted for a deployment based only on the IPv6 protocol (that is to say "IPv6-only") use, to ensure a continuity of the IPv4 services, a function for converting IPv6 packets into IPv4 packets and vice versa, including a function for translating IPv4 addresses into IPv6 addresses (and vice versa). This function, commonly designated NAT64 (that is also called a function for translating IPv4 packets into IPv6 packets), is described in the document RFC 6146 published by the IETF (Internet Engineering Task Force) in April 2011 and entitled "Stateful NAT64: Network Address and Protocol Translation from IPv6 Clients to IPv4 Servers".

Referring to FIG. 1, consider:

an IPv6-only network N1 in which only an IPv6 connectivity service is activated for the transfer of the IP packets, and to which a terminal TERM is connected that has only an IPv6 stack; and an IPv4-only network N2 in which only an IPv4 connectivity service is activated for the transfer of the IP packets and to which a remote server SERV is connected which is therefore accessible only in IPv4 mode.

To allow the terminal TERM to access the remote server SERV, an NAT64 function is invoked to, on the one hand, use an external IPv4 address (and an external port number) which make it possible to set up a communication with the remote server SERV, and, on the other hand, maintain the association between this external IPv4 address and the IPv6 source address (as well as the source port number) used by the terminal TERM. To this end, the NAT64 function uses specific IPv6 addresses which contain IPv4 addresses, and as defined by the IETF in the document RFC 6052 entitled "IPv6 Addressing of IPv4/IPv6 Translators", October 2010. Such IPv6 addresses can be of different types, and more particularly:

of "IPv4-embedded IPv6" type designating an IPv6 address comprising 32 bits corresponding to an IPv4 address among its 128 bits;

of "IPv4-converted IPv6" type (variant of the "IPv4-embedded IPv6" type address) designating an IPv6 address representing an IPv4 node in an IPv6 network (in other words, an IPv4 node will be accessible with this address from an IPv6-only node); and of "IPv4-translatable IPv6" type designating an IPv6 address assigned to an IPv6 node allowing a stateless IPv6-IPv4 interconnection.

To transform an IPv4 address into an "IPv4-embedded IPv6" address (and vice versa), the operators can use a prefix called NSP (for "Network Specific Prefix") forming part of their overall IPv6 prefix or a prefix called WKP (for "Well-Known Prefix") allocated by the IETF, for example the prefix "64:ff9b::/96" (other WKP prefixes have been reserved by the IETF such as the prefix "64:ff9b::/48"). It will be noted that when the length of the prefix used is less than 96, a hexadecimal notation is preferred in order to represent the duly constructed IPv6 address (in other words, the included IPv4 address will not be represented in decimal). Thus, as an illustration, "2001:db8:122:344:c0:2:

2100::" is the result of the construction of a "fake" (dummy) IPv6 address from the address "192.0.2.33", using an NSP prefix "2001:db8:122:344::/64"; "64:ff9b::192.0.2.33" is the result of the construction of a "fake" IPv6 address from the address 192.0.2.33 using a WKP prefix 64:ff9b::/96. The NAT64 function is configured with the NSP or WKP prefix according to different engineerings to construct IPv6 addresses on the basis of IPv4 addresses and vice versa. The term "fake" here designates the IPv4 addresses translated into IPv6 addresses by the DNS server by contrast to the "native" IPv6 addresses which are granted to the resources that have IPv6 connectivity.

As is known per se, a DNS ("Domain Name System") service allows a terminal of a user (or the applications embedded in that terminal), connected to an IP network, to obtain, from a domain name, the IP (IPv4 and/or IPv6) address or addresses of the network resource designated by this domain name. A network resource is understood to be any type of device or equipment benefitting from IP connectivity and that can be reached via an IP address, such as a server for example. Several transport modes can be envisaged for the exchange of the DNS messages including those defined recently by the IETF like DNS-over-TLS, DNS-over-DTLS or DoH (DNS-over-HTTP).

A network resource that has IPv4 connectivity and that can therefore be reached via an IPv4 address can publish with the DNS service a DNS record of type A (or A RR (Resource Record)), establishing the correspondence between the domain name which is associated with it and its IPv4 address. A network resource that has IPv6 connectivity and therefore that can be reached in IPv6 mode can publish a record of AMA type (or AMA RR). A network resource that benefits from IPv4 connectivity and IPv6 connectivity, and that can therefore be reached via an IPv4 address and via an IPv6 address, can publish two records of type A and AMA respectively. The RR records of type A and MM are described respectively in the IETF documents RFC1035 and RFC3596. The publishing of the DNS records is performed by the network resource (for example, by means of the "Dynamic DNS" mechanism) or by another entity (for example, administrator). Hereinbelow, no assumption is made as to the method used for the publishing of such records.

According to the current mode of operation of the DNS services, when a terminal wants to reach a network resource such as a server for example, it sends to the DNS service a resolution request for the domain name that it possesses, in order to access the server. In this domain name resolution request, the terminal must specify the type of record (A or MM) that it wants in response to its request. Thus, a terminal which supports both the IPv4 protocol and the IPv6 protocol must send two requests to the DNS service: a first request indicating a record of type A and intended to obtain one or more IPv4 addresses of the network resource (also designated "DNS request to obtain an IPv4 address" or more simply "DNS request of type A" hereinafter in the description), and a second request indicating a record of type AMA and intended to obtain one or more IPv6 addresses of the network resource (also designated "DNS request to obtain an IPv6 address" or more simply "DNS request of type AMA" hereinafter in the description). The activation of IPv6 in a network therefore has implications on the dimensioning of the DNS servers, because two domain name resolution requests can be transmitted for one and the same network resource. These implications are all the greater if these two requests have to be sent simultaneously (and not sequentially) in order to optimize the communication setup delays.

The providers of IP connectivity who have made the choice to deploy NAT64 functions in their networks almost systematically deploy a DNS64 function, configured with the same prefixes as those used by the NAT64 function, in order to construct IPv6 addresses of "IPv4-converted IPv6" type on the basis of the IPv4 addresses of the IPv4-only servers. This engineering, which relies on the use of the NAT64 and DNS64 functions supposes in theory that an IPv6 terminal transmits to the DNS service only DNS requests of type MM (IPv6) and not of type A (IPv4). However, in practice, the current deployments reveal a non-optimal behavior of the terminals which systematically send two DNS requests of type A and of type MM, for a same network resource. As indicated previously, this behavior of the terminals has significant implications on the dimensioning of the DNS servers (doubling the processing load because of the two requests transmitted for each resolution, impact on the volume of the DNS traffic), but also on the latency induced in the setting up of the connections of the users, which can result in a degradation of the quality of the connectivity service as perceived by the users of the terminals.

One solution to this problem could consist in restricting by configuration the type of the DNS requests transmitted by the terminals connected to an IPv6-only network. However, this does not constitute a viable solution.

In fact, increasingly more third-party operators (distinct from the operators providing the IP connectivity services) these days offer the users of terminals public DNS services. According to these third-party operators, these public DNS services enhance the quality of experience of the users compared to the DNS servers operated by the operators of IP connectivity services, and/or offer advanced security and confidentiality functions. Thus, some third-party operators indicate providing a response to a DNS request in 11 ms while the average observed among the operators of IP connectivity services is 68 ms. Faced with such arguments, increasingly more users are replacing, on their terminals (whether fixed or mobile), the nominal DNS service configuration supplied by their IP connectivity operator with a configuration involving a public DNS server.

In this context, the restriction of the DNS requests transmitted by terminals connected to an IPv6-only network to a single type of request, in this case AMA, could cause the access by these terminals to the IPv4-only servers to be prohibited, which is neither desirable nor acceptable.

SUMMARY OF THE INVENTION

The invention notably makes it possible to overcome the drawbacks of the state of the art by proposing a method for a client device to obtain an IP address in order to access a network resource (associated, for example, with a domain name) via at least one network providing an IP connectivity service to the client device, this method being implemented by the client device and comprising:

a step of insertion, into a request to obtain an IPv6 address in order to access the network resource intended for the DNS server (in other words, in a DNS request of type AMA as mentioned previously), of a piece of information representative of a type of IP address expected by the client device from the DNS server in response to the obtaining request if the network resource has IPv4 connectivity; and a step of sending the request to the DNS server.

Correlatively, the invention relates also to a client device connected to at least one network supplying an IP connectivity service to the client device, this client device comprising:

- an insertion module, configured to insert, into a request to obtain an IPv6 address in order to access a network resource via the network, intended for a DNS server, a piece of information representative of a type of IP address expected by the client device from the DNS server in response to the obtaining request if the network resource has IPv4 connectivity; and
- a sending module, configured to send the obtaining request to the DNS server.

For example, in a particular embodiment, the piece of information representative of the type of IP address expected and as inserted into the DNS request can be at least one IPv6 prefix or at least one IPv6 address comprising at least one IPv6 prefix, if the expected IP address type is a fake IPv6 address formed by the DNS server from said at least one IPv6 prefix and an IPv4 address of the target network resource. The IPv6 prefix can notably be a prefix used by a function (e.g. NAT64) for converting IPv4 (data) packets into IPv6 (data) packets (and vice versa) implemented by the network that the client device envisages using to access the network resource, or an IP address comprising such a prefix.

As a variant, the inserted piece of information can be a predefined value (for example a zero value or another prefix dedicated to this use), known to the DNS server, if the expected IP address type is an IPv4 address of the network resource.

Correlatively, the client device according to the invention can further comprise a module for translating IPv4 addresses into IPv6 addresses activated on reception of a response from the DNS server to said obtaining request and comprising an IPv4 address of said network resource, said translation module being configured to translate said IPv4 address into an IPv6 address by using said IPv4 address and an IPv6 prefix used by a function for converting IPv4 packets into IPv6 packets implemented by the network.

The piece of information inserted by the client device into the request to obtain an IPv6 address therefore allows the latter to specify whether it expects, in response to this request to obtain an IPv6 address (in other words in the response to the request to obtain an IPv6 address, that is to say in the "Answer Section" part of a response of AMA type if the obtaining request is a DNS AMA request), a fake IPv6 address or an IPv4 address when the network resource has IPv4 connectivity.

Note that the invention applies advantageously regardless of the DNS server with which the client device is configured: it can be a DNS server that is designated here as "nominal" supplied by the operator offering the IP connectivity service to the client device, for example upon its attachment to the network or in a prior configuration (for example, a "factory" configuration), or an alternative DNS server, such as, for example, a public DNS server that the user of the client device has chosen to use instead of the nominal DNS server provided by its operator. This is made possible by virtue of the piece of information supplied by the client device to the DNS server when it interrogates it in order to obtain the IP address of the network resource that it wishes to access.

Furthermore, the invention is described with reference to a network providing an IP connectivity service to the client device. It should be noted that the client device can simultaneously have several active connection interfaces allowing access to different networks, each of these networks providing it with IP connectivity; the invention then applies to each DNS server configured for each of these active connection interfaces. A same DNS server can be used for several active connection interfaces, or each active connection interface can use a distinct DNS server.

The invention offers a mechanism which makes it possible to reconcile the needs of the service providers (providers of IP connectivity and public DNS providers), the needs of the users, but also those of the terminal constructors.

In fact, the mechanism offered by the invention allows a client device, by means of a single request of type MM (request to obtain an IPv6 address in order to access the network resource within the meaning of the invention), to obtain different types of IP addresses depending on whether the network resource to which it seeks access benefits from IPv4 connectivity, IPv6 connectivity or both, as a function of the capabilities of the client device which sets the type of IP address that it wishes to receive if the network resource has IPv4 connectivity. The invention thus allows an IPv6-only client device to access IPv4-only, IPv6-only or IPv4/IPv6 network resources, without unnecessarily overloading the DNS server invoked by the client device and while saving on the resources of the client device (notably its battery if it is a mobile device). The traffic routed by the access networks, and more particularly the volume density of the DNS traffic, is optimized, and, consequently, the communication setup delays are also optimized. The result thereof is an enhanced quality of experience as perceived by the users of the client devices.

Furthermore, the invention offers freedom to the user of the client device who can, without preference, use the nominal DNS server of his or her IP connectivity operator or configure his or her client device with a DNS server provided by a third-party operator, such as, for example, a public DNS server as mentioned previously. By virtue of the invention, there is thus a form of functional parity between the client devices that use the nominal DNS servers offered by their IP connectivity providers and the client devices which decide to use alternative DNS services offered by third-party service providers.

The invention also makes it possible to manage different possible configurations of the network and notably of the DNS server used for this network which may or may not embed a DNS64 function for translating IPv4 addresses into IPv6 addresses to facilitate service continuity.

It should be noted that some client devices may themselves embed an address translation module, also known by the name CLAT ("Customer side (Address) Translator") or BIH (Bump-in-the-Host) module or function, for example to allow an application installed on the client device and which can operate only on an IPv4 stack to transmit messages to IPv4 addresses including when the client device has only IPv6 connectivity. Such a module is described in the IETF document RFC 6877 entitled "464XLAT: Combination of stateful and stateless translation", April 2013. When a DNS64 function is implemented by the DNS server consulted by the client device to access a resource, this DNS64 function and the CLAT module of the client device are then redundant if they are activated simultaneously. The invention makes it possible to avoid such redundancy and notably minimize recourse to the CLAT module.

In particular, in the example of information that can be inserted into the obtaining request provided above, the predefined value makes it possible to manage the case in which no DNS64 function is implemented by the DNS server consulted by the client device or to deactivate the recourse to a DNS64 function supported by this DNS server.

In this case, if the client device implements a CLAT module, it can use the IPv4 address which is returned to it to proceed itself with the translation of this IPv4 address into an IPv6 address.

Thus, the invention offers the possibility of avoiding redundancy in the case where the DNS64 function is also supported by the DNS server, but also of allowing the client device to directly manage the construction of IPv6 addresses.

If the DNS server implements a DNS64 function, the client device can supply the DNS server with the prefix to be used to generate a fake IPv6 address for the IPv4-only or dual-stack (IPv4-IPv6) network resource from its IPv4 address. The IPv6 address thus formed by the DNS64 server is then returned to the client device in the response from the DNS64 server. The prefix supplied is typically that used by a NAT64 function for converting IPv4 packets into IPv6 packets present in the network via which the client device wishes to access the network resource.

The invention therefore applies also in the case of networks that do not implement a DNS64 function and that rely on an implementation of such a function by the client devices themselves.

The invention is therefore particularly advantageous in the context of current IPv4 to IPv6 migration described previously.

In a particular embodiment, the obtaining request can further comprise:

an instruction to generate said address in the IPv6 format only if the network resource has only IPv4 connectivity; or an instruction to generate said address in the IPv6 format if the network resource has IPv4 connectivity even if it also has IPv6 connectivity.

By virtue of this additional instruction inserted in the obtaining request by the client device when it expects an address in the IPv6 format, it is possible to more optimally manage the case where an IPv4-only application configured to communicate with an IPv4-IPv6 network resource is embedded onto an IPv6-only client device (which then also embeds a CLAT module). In fact, the client device can in this case ask the DNS server to send to it, in response to its request, not only the native IPv6 address of the network resource (what the DNS server will do by default on reception of a request of AAAA type when the network resource has IPv6 connectivity), but also its IPv4 address that the client device can then supply directly to the application without needing to activate a NAT46 function in order to convert the native IPv6 address of the network resource into an IPv4 address that the application is able to use. Note that the client device is capable of distinguishing a fake IPv6 address generated (i.e. formed) by the DNS server for the network resource from a native IPv6 address of that network resource in case of dual connectivity of the network resource, since it has prefixes used to form the fake IPv6 addresses.

In another embodiment, the obtaining request can also comprise other indications intended for the DNS server, such as, for example:

an instruction to execute a determined algorithm to form an IPv6 address from an IPv4 address of the network resource (for example the algorithm defined in the IETF document RFC 6052); and/or an instruction to use a known prefix (WKP for Well-Known Prefix) to form an IPv6 address from an IPv4 address of the network resource; and/or an instruction to use a suffix which guarantees neutrality of a "checksum" (integrity checking mechanism) of a pseudo-header of a transport layer; and/or an instruction to return one or more IPv4 addresses to an additional section of a response to the obtaining request.

The instruction to use the WKP prefix can prove useful notably in an embodiment in which there is a desire for the IPv4 address of the network resource if appropriate to be transmitted to the client device in the body of the response from the DNS server. In this embodiment, the IPv4 address can then be coded according to an IPv6 format by using the WKP prefix.

It should not be forgotten that the TCP pseudo-header also covers the source and destination addresses of the IP layer. Thus, any modification of these addresses renders the verification of the checking based on the pseudo-header (called "checksum") obsolete. The instruction to use a suffix makes it possible to avoid recalculating the TCP "checksum" in the conversion of the IPv4 packets into IPv6 packets and vice versa by a NAT64 (or CLAT) function. If this instruction is not used, the NAT64 function must recalculate the "checksum" on the basis of the new pseudo-header.

In a particular embodiment, the method further comprises a step of determining whether the network implements a function for converting IPv4 packets into IPv6 packets (and vice versa) (that is to say, a NAT64 function).

If appropriate, the method can further comprise a step of obtaining at least one IPv6 prefix used by said conversion function (that is to say, NAT64).

This allows the client device to discover, dynamically by itself, whether the network to which it is connected and that it envisages using in order to access the network resource implements or does not implement a NAT64 function. This embodiment offers a particular advantage when the client device has several active network interfaces or when it changes network interface. Note that there is no limitation associated with the portion of the network implementing the NAT64 function: this function can be located in the access network, the core network, or in an interconnected network, etc.

As a variant, the client device can be configured with this information independently of the implementation of the method according to the invention, for example in the context of a "factory" configuration. This variant is appropriate notably for client devices such as CPE (for "Customer Premises Equipment").

To discover whether the network implements or does not implement a function for converting IPv4 packets into IPv6 packets, various techniques can be envisaged.

Thus, in a particular embodiment, the DNS server to which the client device sends the obtaining request is a server distinct from a so-called "nominal" DNS server with which the client device has been configured by an operator of the network, and:

the determination step comprises a step of sending, to a nominal DNS server, a request to obtain an IPv6 address in order to access a given network resource known to have only IPv4 connectivity; and if a positive response is received from the nominal DNS server comprising an IPv6 address to be used to access the given network resource, the client device determines that the IP network implements a function for translating IPv4 packets into IPv6 packets (NAT64 function).

In this embodiment, the method can further comprise a step of obtaining an IPv6 prefix used by the function for converting IPv4 packets into IPv6 packets from the IPv6 address contained in the positive response received from the nominal DNS server.

This embodiment requires the storage on the client device of the information relating to the nominal DNS configuration supplied by the operator of the network providing it with its IP connectivity in order to access the network resource if the client device is then configured with an alternative DNS server. It does however provide a solution that is very simple to implement by the client device in order to dynamically discover whether the IP network comprises a NAT64 function, and to do so without involving said NAT64 function.

In another embodiment, the determination step can be implemented using the Port Control Protocol (PCP).

The PCP protocol is known per se and described in particular in the IETF document RFC 7225 entitled "Discovering NAT64 IPv6 Prefixes Using the Port Control Protocol (PCP)", May 2014.

This embodiment presents the advantage of being reliable and deterministic because the information on the presence of a NAT64 function, and the prefixes used by this function, are provided if necessary by the NAT64 function itself which is located on the path of the messages transmitted by the client device. Furthermore, it makes it possible to manage the case where several NAT64 functions are implemented by the operator of the network.

In yet another embodiment, the obtaining method according to the invention comprises:
  a step of reception of an advertisement message originating from the network comprising at least one IPv6 prefix used by a function for converting IPv4 packets into IPv6 packets implemented by the network; and
  a step of storage of said at least one IPv6 prefix contained in the advertisement message.

In this embodiment, the client device uses the information advertised by the network itself to deduce therefrom whether the latter uses a NAT64 function, and if appropriate to obtain the prefix or prefixes that this function uses.

Furthermore, this embodiment does not involve the NAT64 function in the discovery process and is based on configuration mechanisms that are known per se.

In a particular embodiment, the determination step is reiterated for the network on detection of a change affecting a network configuration of the client device for said network.

Such a change is for example a change of the DNS server interrogated by the client device in order to access a resource via this network or a connection to a new network. The invention thus makes it possible to adapt dynamically and transparently for the user of the client device to the changes of configuration of the client device, and notably of DNS configuration (for example when the user decides to use an alternative DNS server instead of its nominal DNS server or if a change of DNS configuration is decided by the operator of the network).

In light of the above, the invention is based on the client device and the obtaining method implemented thereby, but also on the DNS server which processes the DNS requests originating from the client device and the processing method executed by the latter.

Thus, the invention also targets a processing method, by a DNS server associated with a network providing an IP connectivity service to at least one client device, this method comprising:
  a step of reception, from a client device, of a request to obtain an IPv6 address in order to access a network resource, a request in which there is inserted a piece of information representative of a type of IP address expected by the client device from the DNS server in response to the obtaining request if the network resource has IPv4 connectivity;
  if the network resource has IPv6 connectivity, a step of sending, to the client device, in response to the request, an IPv6 address of said network resource;
  if the network resource has IPv4 connectivity:
    a step of obtaining an IPv4 address of the network resource; and
    a step of sending a response to the obtaining request containing at least one IP address in order to access the network resource determined by the DNS server from the IPv4 address obtained and corresponding to the IP address expected by the client device.

Correlatively, the invention relates to a DNS server comprising:
  a reception module, capable of receiving, from a client device connected to a network supplying an IP connectivity service to said client device, a request to obtain an IPv6 address in order to access a network resource via said IP network;
  a detection module, configured to detect, in the obtaining request, a piece of information representative of a type of IP address expected by the client device from the DNS server in response to the obtaining request if the network resource has IPv4 connectivity;
  a sending module, activated if the network resource has IPv6 connectivity, and configured to send, to the client device, in response to the obtaining request, an IPv6 address of the network resource;
  modules, activated if the network resource has IPv4 connectivity, comprising:
    an obtaining module configured to obtain an IPv4 address of the resource; and
    a sending module, configured to send a response to the obtaining request containing at least one IP address in order to access the network resource determined by the DNS server from said IPv4 address obtained and corresponding to the type of IP address expected by the client device indicated by the piece of information inserted into the obtaining request.

The processing method and the DNS server according to the invention benefit from the same previously-cited advantages as the obtaining method and the client device according to the invention.

The invention also offers the possibility for a DNS server to respond to a request to obtain an IPv6 address with an IPv4 address when the network resource for which the client device seeks to obtain an address has IPv4 connectivity, and the client device indicates that it expects, in response to its request to obtain an IPv6 address, an IPv4 address.

In a particular embodiment, the piece of information inserted into the obtaining request comprises at least one IPv6 prefix or at least one IPv6 address comprising at least one IPv6 prefix and said at least one IP address determined by the DNS server comprises at least one IPv6 address formed by the DNS server from said at least one IPv6 prefix and from the IPv4 address of the network resource obtained.

As a variant, the piece of information inserted into the obtaining request can have a predefined value known to the DNS server, and said at least one IP address determined by the DNS server is then the IPv4 address of the network resource obtained.

It will be noted that the IPv4 address of the network resource can be sent in the response from the DNS server coded according to the IPv4 format in an additional section of the response.

As a variant, the IPv4 address can be transmitted in the body of the response from the DNS server, coded according to the IPv6 format, for example by using the prefix "::ffff: 0:0/96".

In a particular embodiment, the sending step and the obtaining step are implemented by the DNS server only if the network resource has only IPv4 connectivity. In other words, if the network resource also has IPv6 connectivity in addition to IPv4 connectivity, it is the IPv6 address of the network resource which is sent by default in response to the obtaining request of type AAAA to the client device.

In another embodiment, the sending and obtaining steps are implemented when the network resource has IPv4 connectivity, even if it also has IPv6 connectivity. The advantage of this embodiment has been described previously and is not taken up again here.

In a particular embodiment, the obtaining method and/or the processing method are implemented by a computer.

The invention also targets a first computer program on a storage medium, this program being able to be implemented in a computer or, more generally, in a client device that conforms to the invention and comprises instructions suited to the implementation of an obtaining method as described above.

The invention also targets a second computer program on a storage medium, this program being able to be implemented in a computer or, more generally, in a DNS server that conforms to the invention and comprises instructions suited to the implementation of a processing method as described above.

Each of these programs can use any programming language, and be in the form of a source code, an object code, or of an intermediate code between a source code and an object code, such as in a partially-compiled form, or in any other desirable form.

The invention also targets an information medium or a storage medium that can be read by a computer, and comprising instructions of the first or second computer program mentioned above.

The information or storage media can be any entity or device capable of storing the programs. For example, the media can comprise a storage means such as a ROM, for example a CD ROM or a microelectronic circuit ROM, or even a magnetic storage means, for example a hard disk, or a flash memory.

Also, the information or storage media can be transmissible media such as an electrical or optical signal, which can be conveyed via an electrical or optical cable, by radio link, by wireless optical link or by other means.

The programs according to the invention can in particular be downloaded over a network of Internet type.

Alternatively, each information or storage medium can be an integrated circuit in which a program is incorporated, the circuit being adapted to execute or to be used in the execution of the obtaining method according to the invention or of the processing method according to the invention.

According to another aspect, the invention targets a communication system comprising:
at least one client device according to the invention connected to at least one IP network via a connection interface; and
at least one DNS server according to the invention to be used by the client device in association with said connection interface.

In a particular embodiment, the DNS server is a public server distinct from a so-called nominal DNS server with which the client device has been configured by the operator of the IP network.

The communication system according to the invention benefits from the same previously-cited advantages as the obtaining method, the processing method, the client device and the DNS server according to the invention.

In other embodiments, the possibility of the obtaining method, the processing method, the client device, the DNS server and the communication system according to the invention having, in combination, all or part of the above-mentioned characteristics can also be envisaged.

BRIEF DESCRIPTION OF THE DRAWINGS

Other features and advantages of the present invention will emerge from the description given below, with reference to the attached drawings which illustrate an entirely nonlimiting exemplary embodiment thereof. In the figures:

FIG. 1, already described, represents, in its environment, a communication system of the state of the art in which a NAT64 function is implemented between an IPv6-only network and an IPv4-only network;

FIG. 2 represents, in its environment, a communication system according to the invention, in a particular embodiment, this system comprising a client device and a DNS server that conform to the invention;

FIG. 3 schematically illustrates the hardware architecture of the client device of FIG. 2, in a particular embodiment;

FIG. 4 schematically illustrates the hardware architecture of the DNS server of FIG. 2, in a particular embodiment;

FIG. 5 represents, in flow diagram form, the main steps of an obtaining method according to the invention as implemented by the client device of FIG. 2, in a particular embodiment;

FIG. 6 represents a first possible format for the piece of information inserted in accordance with the invention in its DNS requests by the client device of FIG. 2;

FIG. 7 represents a second possible format for the piece of information inserted in accordance with the invention in its DNS requests by the client device of FIG. 2;

FIG. 8 represents, in flow diagram form, the main steps of a processing method according to the invention as implemented by the DNS server of FIG. 2, in a particular embodiment;

FIG. 9 illustrates the consequences, on the quality of experience of a communication between a client device and a network resource, of the use of an IPv6 address for the network resource returned by the DNS server and that does not correspond to the network connection interface for which it was generated; and FIG. 10 illustrates another example of consequences, on the quality of experience of a communication between a client device and a network resource, of the use of an IPv6 address for the network resource returned by the DNS server and that does not correspond to the network connection interface for which it was generated.

DESCRIPTION OF THE INVENTION

FIG. 2 represents, in its environment, a communication system 1 that conforms to the invention, in a particular embodiment.

The communication system 1 comprises at least one client device T, that conforms to the invention. In the example envisaged here, the client device T is a terminal of a user, such as, for example, a smartphone, a digital tablet, a portable computer, etc. Note that no limitation is attached to the nature of the client device T. It can be, as a variant, a router or CPE (for "Customer Premises Equipment") connected to a local area network, a USB key or a dongle attached to a user equipment, etc.

In accordance with the invention, the client device T has at least one active connection interface via which it is connected to at least one network providing it with an IP connectivity service (designated, for simplicity hereinbelow, as "IP network"). In the example of FIG. 2, the client device T has two active connection interfaces I1 and I2, via which it is connected respectively to the IP network NW1 and to the IP network NW2. The networks NW1 and NW2 both provide the client device T with IP services and, in particular, IP connectivity allowing the client device T to connect to the public Internet network. No limitation is attached to the nature of the IP services provided by the networks NW1 and NW2 to the client device (IP connectivity, voice-over-IP service, etc.), or to the nature of the networks NW1 and NW2. They can be fixed or mobile networks, such as, for example, 3G, 4G or 5G networks, that conform to any one of the versions of the 3GPP standard (Release 15, 16, and subsequent releases), of the WLAN (Wireless Local Access Network) networks, etc.

As mentioned previously, the invention makes it possible to simplify the migration of the IP networks for which they support communications set up according to the IPv6 protocol. In the interests of simplification, it is assumed here that the networks NW1 and NW2 provide the client device T only with IPv6 connectivity. In other words, the networks NW1 and NW2 are assumed here to be IPv6-only. As a variant, another configuration of the networks NW1 and NW2 could be envisaged, such as, for example, a dual-stack IPv4-IPv6 configuration. Furthermore, in the interests of simplification, it is also assumed that the client device T is IPv6-only, in other words, it has only IPv6 connectivity and does not have IPv4 connectivity.

In the example of FIG. 2, the networks NW1 and NW2 each host a DNS server, making it possible to resolve domain names, respectively referenced DNS #11 for the network NW1 and DNS #21 for the network NW2, and that conforms to the invention. These DNS servers are qualified as "nominal" hereinafter in the description, in as much as they are DNS servers provided by the networks NW1 and NW2 and with which the operators of these networks have initially configured the client device T to allow it to access network resources S via their networks, such as a remote server for example. No limitation is associated with the nature of the network resources the client device wishes to access (server, terminal, application, etc.). It is assumed here that the remote server S is connected to the Internet network via an IP network NW3. The IP network NW3 can be IPv6-only, IPv4-only or dual-stack IPv4-IPv6.

This configuration was set up by the operators of the networks NW1 and NW2, for example upon the attachment of the client device T to the networks NW1 and NW2, or in a prior step (for example in the context of a "factory" configuration). It can be performed, as is known per se, by the operators of the networks NW1 and NW2 by using the PCO (Protocol Configuration Option) protocol for the 3GPP networks, or options of the DHCPv6 (Dynamic Host Configuration Protocol for IPv6) protocol for the fixed networks.

During this configuration, the operator of the network NW1, respectively of the network NW2, supplied the client device T with a piece of information on accessibility of the nominal DNS server DNS #11 (that is to say a piece of information allowing access to the server DNS #11), respectively to the nominal DNS server DNS #21. Such a piece of accessibility information can be an IP address of the nominal DNS server. The result of this configuration is that when the client device T wishes to access a network resource (for example the server S) via the network NW1, respectively NW2, it uses its connection interface I1, respectively I2, to send a DNS request to the nominal DNS server DNS #11, respectively DNS #21, by using the piece of accessibility information which was communicated to it to access this nominal DNS server. The client device thus contacts the DNS server in order to obtain an IP request that allows it to access this network resource.

The Table 1 below provides, by way of illustration, an extract from a DNS configuration reflecting the information received from a 3GPP network by a client device, such as the client device T, by using the PCO protocol.

TABLE 1

...
Access Point Name
  Length: 4
  APN: myipv6onlyapn
PDN address
  Length: 9
  0000 0... = Spare bit(s): 0x00
  PDNtype: IPv6 (2)
  PDN IPv6 if id: 0000000000000011
ESM cause
  Element ID: 0x58
  Cause: PDNtype IPv6 only allowed (51)
Protocol Configuration Options
  ...
  Protocol or Container ID: DNS Server IPv6 Address (0x0003)
    Length: 0x10 (16)
    IPv6: 2001:db8::1

The information supplied by the 3GPP network reported in the Table 1 indicate to the client device T that only IPv6 connectivity is supported by the network (ESM cause 51 "PDN type IPv6 only allowed"), and that a DNS server is provided by the network for which the IPv6 address is "2001:db8::1".

The client device T retrieves the nominal DNS configuration information associated with each of its active connection interfaces (in other words, for each IP network to which it is connected via a connection interface), in this particular case its connection interface I1 to the network NW1 and its connection interface I2 to the network NW2. It stores the retrieved information in a local configuration file called CONFIG-DNS. Note that one and the same nominal DNS server can be defined for connection interfaces to distinct IP networks.

In the embodiment described here, each nominal DNS server (that is to say chosen by the operator of the IP network for its users) is associated in the local configuration file CONFIG-DNS with a parameter here called NOMINAL-RESOLVER, and set at 1 to indicate that it is a nominal DNS server. Each nominal DNS server is also associated with a parameter here called NETWORK-ID allowing this nominal DNS server to be linked unambiguously to the IP network via which said DNS server was configured, or, equivalently, the connection interface used by the client device T to access the IP network. The structure of the NETWORK-ID parameter is local to each client device. As an example, the NETWORK-ID parameter can be set with an identifier of the connection interface used to connect to the IP network supporting the nominal DNS server (and hosting it here) or an identifier of the IP network supporting the nominal DNS server. In the example considered here, as an illustration, the NETWORK-ID parameter is set at NW1 for the server DNS #11 and at NW2 for the server DNS #21.

Note that the list of the nominal DNS servers kept in the local configuration file CONFIG-DNS can be made to undergo modifications initiated by the IP networks to which the client device T is connected and be updated according to instructions received from these IP networks. Such can be the case notably when one of the IP networks to which the client device T is connected wants the client device T, in order to resolve its DNS requests, to use a new nominal DNS server (for example, for the IP network NW1, a server DNS #12 instead of the server DNS #11), or in the case of roaming of the client device T ("handover") between several IP networks. In this case, the client device T replaces, in the local configuration file CONFIG-DNS, the now obsolete nominal DNS server with the new nominal server supplied by its operator.

In the example considered here, the communication system 1 further comprises an alternative DNS server, referenced DNS #2, that conforms to the invention (also more commonly designated public DNS server) and located in the public Internet network. It is assumed that this alternative DNS server can be used independently of the connection interface selected by the client device T for the routing of its DNS requests. An alternative DNS server is understood here to be one that is not hosted by the networks NW1 and NW2 but by a third-party network. Such a DNS server is then qualified as public. The Google Public DNS, Cloudflare and even QUAD9 servers are examples of such public DNS servers.

It is assumed here that the client device T is provided with an application module which allows its user, manually or via a trust application, to configure the use of one (or several) alternative DNS server or servers as described hereinabove instead of the nominal DNS servers supplied to the client device T by the operators of the networks to which it is connected. In the example considered, the client device T is thus configured with the alternative public DNS server DNS #2; it is assumed here that the server DNS #2 can be used regardless of the connection interface used by the client device T (that is to say its connection interface I1 to the network NW1 or its connection interface I2 to the network NW2), and that the client device T is configured to use this alternative DNS server DNS #2 instead of the servers DNS #11 and DNS #21. In other words, the client device T is configured via the application module to now address its DNS requests to the public DNS server DNS #2 when it wishes to access a network resource (for example the server S) by using its connection interface I1 or its connection interface I2.

As a variant, a different alternative DNS server can be used for each active connection interface of the client device T.

As for the nominal DNS servers, the configuration of the client device T with the alternative server DNS #2 consists notably in storing on the client device T a piece of accessibility information concerning the alternative DNS server DNS #2, for example its IP address. This configuration is stored here in the local configuration file CONFIG-DNS of the client device T. In the embodiment described here, although the alternative DNS server is intended to be used in place of the nominal DNS servers DNS #11 and DNS #21, the accessibility information of the nominal DNS servers is kept in the configuration file.

In the configuration file CONFIG-DNS, in order to distinguish the alternative DNS server DNS #2 used by the client device T to resolve its DNS requests from the nominal DNS servers DNS #11 and DNS #21 initially provided by the operators of the networks NW1 and NW2, the alternative server DNS #2 is associated with parameter NOMINAL-RESOLVER set at 0.

Furthermore, since the server DNS #2 can be used by the client device T independently of the active connection interface employed by the latter (that is to say I1 or I2), no NETWORK-ID parameter is associated with the server DNS #2 in the configuration file CONFIG-DNS.

As a variant, the server DNS #2 can be associated with a NETWORK-ID parameter set at NW1 and NW2. If a distinct alternative DNS server is used for each active connection interface, each alternative DNS server has associated with it a NETWORK-ID parameter identifying the connection interface used by the client device T to access this alternative DNS server.

Table 2 below illustrates an extract from the configuration file CONFIG-DNS.

TABLE 2

| | | |
|---|---|---|
| DNS#11 | NOMINAL-RESOLVER = 1 | NETWORK-ID = NW1 |
| DNS#21 | NOMINAL-RESOLVER = 1 | NETWORK-ID = NW2 |
| DNS#2 | NOMINAL-RESOLVER = 0 | |

Note that the NETWORK-ID parameter can be omitted also when the client device T is mono-interface, that is to say that it has a single active connection interface and is connected to only one IP network. In this case, the absence of the NETWORK-ID parameter for the nominal DNS server (that is to say, for the DNS server associated with a parameter NOMINAL-RESOLVER=1) indicates that it is the nominal DNS server provided or hosted by the operator of the network associated with this single connection interface.

As a variant, distinct files can be used to store, on the one hand, the nominal DNS servers provided by the operators and, on the other hand, the alternative DNS servers.

Moreover, in the embodiment described here, only the servers of the configuration file CONFIG-DNS associated with a NOMINAL-RESOLVER parameter set at 0 are used by the client device T to resolve its DNS requests. The other servers associated with a NOMINAL-RESOLVER parameter set at 1 are used here to discover the IP networks NW1 and NW2 which implement a NAT64 function, and if appropriate the IPv6 prefix or prefixes used by this function. Note that if no alternative DNS server is associated with a connection interface, the client device T is configured to use by default the nominal DNS server provided by the operator of the network associated with this connection interface.

In the embodiment described here, the client device T has the hardware architecture of a computer, as illustrated schematically in FIG. 3. It notably comprises a processor 2, a random-access memory 3, a read-only memory 4, a non-volatile flash memory 5 in which is stored, for example, the local configuration file CONFIG-DNS, and communication means 6 comprising, in particular, the connection interfaces I1 and I2 and an IPv6 protocol stack.

The read-only memory 4 is a storage medium that conforms to the invention, that can be read by the processor 2 of the client device T, and on which is stored a computer program PROG1 according to the invention, which comprises instructions for the implementation of an obtaining method according to the invention. In other words, the computer program PROG1 defines different functional modules of the client device T that allow it to implement the obtaining method according to the invention. In the embodiment described here, these modules comprise (see FIG. 2) an insertion module M1 configured to insert, in accordance with the invention, a specific option into the DNS requests that the client device T addresses to the DNS servers with which it was configured, this option being called here PREFIX64 here and described subsequently, a sending module M2 configured to send these DNS requests to the DNS servers concerned, and a module M3 configured to determine whether the IP networks with which it has an active connection interface implement or do not implement a NAT64 function for converting IPv4 packets into IPv6 packets and vice versa. Hereinafter in the description, in the interests of simplification, such a function will be designated by a function for converting IPv4 packets into IPv6 packets, even though it is also able to convert IPv6 packets into IPv4 packets. The conversion of the packets requires a function for translating IPv4 addresses into IPv6 addresses.

The functions of the modules M1, M2 and M3 are described in more detail later with reference to the steps of the obtaining method according to the invention.

In the embodiment described here, the servers DNS #11, DNS #21, DNS #2 that conform to the invention also have the hardware architecture of a computer, as illustrated schematically in FIG. 4. Each DNS server comprises a processor 7, a random-access memory 8, a read-only memory 9, a nonvolatile flash memory 10, and communication means 11 one or more connection interfaces according to the IP network in which it is hosted.

The read-only memory 9 is a storage medium that conforms to the invention, that can be read by the processor 7 of the server, and on which is stored a computer program PROG2 according to the invention, which comprises instructions for the implementation of a processing method according to the invention. In other words, the computer program PROG2 defines different functional modules of the DNS server allowing it to implement the processing method according to the invention, and more particularly in the embodiment described here (see FIG. 2), a reception module M4 capable of receiving DNS requests originating from client devices that conform to the invention, a detection module M5, configured to detect whether the DNS requests that it receives contain the specific option PREFIX64, a resolution module M6 for resolving DNS requests that it receives, and a sending module M7 configured to produce and send, to the client devices which invoke it, responses to their DNS requests that take account, if appropriate, of the indications conveyed by the PREFIX64 option.

The functions of the modules M4, M5, M6 and M7 are described in more detail later with reference to the steps of the processing method according to the invention.

There now follows a description, with reference to FIGS. 5 to 10, of the main steps of the obtaining method and of the processing method implemented respectively, in a particular embodiment, by the client device T and by the alternative public DNS server DNS #2.

As mentioned previously, the invention is particularly advantageous in that it allows an IPv6-only client device (for example the client device T) seeking to access a network resource (for example the server S), without knowing beforehand the connectivity that this network resource benefits from (IPv4-only, IPv6-only, or IPv4/IPv6) and, whatever this connectivity, to obtain an IP address for this network resource by interrogating a DNS server with which it is configured by means of a single DNS request requesting, for the network resource, a record of AMA type, in other words by means of a request to obtain an IPv6 address in order to access this network resource within the meaning of the invention. In accordance with the invention, this single request of AMA type allows it, by virtue of the information that it contains, to obtain either a fake IPv6 address or an IPv4 address when the network resource has IPv4 connectivity, based on the expectations of the client device (these being able to result for example from preferences or from the configuration of the client device). An overloading of the DNS servers of the communication system 1 is thus avoided, since the client device T transmits only a single type of DNS request. Furthermore, very advantageously, the invention makes it possible to manage several IP network configurations, and applies whether these networks implement or do not implement a function of DNS64 type. It is also suitable when an address translation function is available on the client device T (for example a CLAT function).

Referring to FIG. 5, in the embodiment described here, the client device T initially determines, via its module M3, whether the IP networks to which it is connected (NW1 and NW2 in the example considered) and that it is likely to use to access network resources implement or do not implement a NAT64 function for converting IPv4 addresses into IPv6 addresses (step E10). It proceeds with this determination for each IP network with which it has an active connection interface. Interest here is focused on a NAT64 function configured to convert an IPv4 address into an "IPv4-embedded IPv6" address (and vice versa), by using an NSP prefix or a WKP prefix as discussed previously. It should be noted that, in the example considered here, no particular interest is focused on an address of "IPv4-converted IPv6" type which is a particular variant of the "IPv4-embedded IPv6" addresses applying to the addresses representing IPv4 network resources in an IPv6 world.

To this end, the client device T can proceed in different ways.

Thus, according to a first variant embodiment, the client device T can detect that an IP network to which it is connected implements (or activates) a NAT64 function because the client device T was configured previously by the operator of the IP network with various elements used by such a NAT64 function, such as, typically, the NAT64 prefixes (that is to say IPv6 prefixes of NSP or WKP type) used by the NAT64 function. This configuration of the client device T can be done by the operator of the IP network via the explicit advertisement by the IP network of the NAT64 prefix or prefixes by using, for example, a dedicated DHCPv6 option, or an RA (Router Advertisement) option as described in the IETF document RFC 4861 entitled "Neighbor Discovery for IP version 6", September 2007, or even an object of the PCO protocol. On reception of such an advertisement, the client device T stores the NAT64 prefixes in the configuration file CONFIG-DNS in association with the corresponding IP network (that is to say corresponding to the connection interface via which it received the advertisement), in the form, for example, of a pairing comprising the NETWORK-ID parameter and a parameter called PREFIX64.

Note that several NAT64 prefixes can be used in one and the same IP network. One and the same NAT64 prefix can moreover be used by several distinct IP networks. The result thereof is that the client device T can maintain one or more pairs {NETWORK-ID, PREFIX64} listing, if necessary, the NAT64 prefixes used by the IP networks to which it is connected.

According to a second variant embodiment, the client device T automatically discovers the presence of NAT64 functions in the IP networks with which it has active connection interfaces by invoking the nominal DNS servers stored in the configuration file CONFIG-DNS (that is to say, the DNS servers associated in the file with a NOMINAL-RESOLVER parameter set at 1).

More specifically, in this second variant, the client device T sends a request DNS to obtain an IP address corresponding to a record of AMA type (also more simply designated here DNS request of MM type) for a given network resource (designated "test" network resource hereinbelow) known to have only IPv4 connectivity. This "test" network resource is, for example, a server that is known to be IPv4-only. As an illustration, a "test" server corresponding to a domain name "myserver.example" that has for its IP address the IPv4 address "192.0.2.33" is considered here as network resource.

This DNS request of AAM type constitutes a request to obtain an IPv6 address for the "test" network resource within the meaning of the invention. Such a DNS request is sent by the client device T by using IPv6 to each nominal DNS server DNS #11 and DNS #21.

If, in response to this DNS request of AAAA type, the client device T receives a positive response from a nominal DNS server comprising an IPv6 address for the "test" server, that means that a DNS64 function is activated on this nominal DNS server and therefore that the IP network hosting this nominal DNS server implements a NAT64 function. Furthermore, the IPv6 address contained in the response received by the client device T has been formed by the nominal DNS server for the IPv4-only test server from its IPv4 address and from the NAT64 prefix from which the nominal DNS server was configured, which coincides, as stressed previously, with the NAT64 prefix used by the NAT64 function implemented by the IP network. The client device T can therefore extract from this IPv6 address the NAT64 prefix concerned; for this purpose, for example, it uses the algorithm specified in section 2.3 of the document RFC 6052.

Thus, as an illustration, if the nominal DNS server DNS #11 returns a positive response comprising the IPv6 address "2001:db8:122:3c0:0:221::/128" for the "test" server "myserver.example", knowing the IPv4 address associated with the "test" server and the algorithm described in the document RFC 6052, the client device T extracts the corresponding NAT64 prefix: "2001:db8:122:300::/56". The client device T then saves this prefix for the IP network NW1, for example in the form of a pairing {NETWORK-ID=NW1, PREFIX64=2001:db8:122:300:156}.

The client device T can also, instead of proceeding at this stage with the extraction of the NAT64 prefix, directly save the IPv6 address returned by the server DNS #11 in the PREFIX64 parameter and store the pairing {NETWORK-ID=NW1, PREFIX64=2001:db8:122:3c0:0:221:1128}.

According to a third variant embodiment, the client device T uses the PCP protocol and notably the mechanism described in the document RFC 7225 to discover the presence of NAT64 functions in the IP networks with which it has active connection interfaces. This mechanism allows the client device T to retrieve the list of the NAT64 prefixes associated with the connection interface that it uses in implementing the mechanism. If, in this implementation, it retrieves at least one NAT64 prefix, that means that the IP network corresponding to the connection interface used implements a NAT64 function.

The procedure for discovering the presence of a NAT64 function in an IP network implemented in the step E10 can also be executed recursively. Such recursive execution is of benefit notably when the client device T is connected via intermediate equipment to the IP network, such as, for example, a CPE. In this case, the CPE executes the discovery procedure by implementing one of the techniques mentioned previously, then communicates to the client device T the NAT64 prefixes discovered in this procedure. To this end, the CPE can use notably an advertisement message of RA type as mentioned previously.

If, in the step E10, the client device T detects the activation of a NAT64 function in one of the IP networks to which it is connected, it associates with this IP network, in the configuration file CONFIG-DNS, a parameter called NAT64_ENABLED set at 1. Thus, in the configuration file CONFIG-DNS, the NAT64_ENABLED parameter is set at "1" for the IPv6-only networks for which at least one NAT64 prefix has been discovered in the step E10. The NAT64_ENABLED parameter is, on the other hand, set at "0" for the IPv4-only networks for the IPv4/IPv6 "dual-stack" networks, and for the IPv6-only networks without NAT64 function.

Note that, in the embodiment described here, the client device T once again executes the procedure for detecting presence of a NAT64 function which has just been described each time it detects a change of the network configuration provided by the operator of a network and which can have an impact on the DNS services. Such a change of network configuration can take place notably, as mentioned previously, when the client device T is in a roaming situation. It can result in an update of the NAT64 prefix or prefixes used by the NAT64 function implemented by the network, if necessary, or by maintaining or, on the other hand, changing, the value of the NAT64_ENABLED parameter depending on whether the network concerned implements or does not implement a NAT64 function, or a change of the nominal DNS server associated with the network, etc.

It is now assumed that the client device T wants to access a network resource S, for example the server S (step E20).

To this end, as is known per se, it sends, via one of its active connection interfaces and its sending module M2, a DNS request to resolve the domain name of the RM server to the DNS server associated with this connection interface (step E70). In the illustrative example considered here, the client device T is configured to invoke the alternative server DNS #2 to resolve its DNS requests, regardless of the connection interface used by the client device T.

In accordance with the invention, the client device T is configured to transmit, only to the DNS server with which it is configured (here, the server DNS #2), DNS requests of type MM, regardless of the connectivity (IPv4, IPv6 or IPv4/IPv6) that the network resource S it wants to access benefits from, in other words, only DNS requests to obtain an IPv6 address in order to access this network resource. This DNS request, denoted R-MM, conventionally contains (in accordance with what is described in the IETF document RFC1035), the domain name associated with the network resource S that it seeks to resolve and the type of record desired, that is to say AMA.

To manage notably the particular case in which the network resource S is not associated with a record of type AMA because it has only IPv4 connectivity (and therefore only one IPv4 address), the invention advantageously provides for the insertion of an additional piece of information into the request R-AAAA by the insertion module M1 of the client device T before it is sent to the server DNS #2 (step E60). This piece of information is inserted, in the embodiment described here, into an option of the extension EDNS (0) of the DNS protocol introduced for this purpose, that is called PREFIX64 in this description. It is representative of the type of IP address expected by the client device T from the server DNS #2, in response to the request R-AAAA, if the network resource S targeted by this request has IPv4 connectivity. This type of IP address expected by the client device T can be either a fake IPv6 address, formed by the DNS server for example, or an IPv4 address as detailed hereinbelow.

In the embodiment described here, the PREFIX64 option is defined (and recognized as such by the DNS server receiving the DNS request containing this option) such that it is representative of the type of IP address expected by the client device from the DNS server that it interrogates with a request R-AAAA containing this option, in the response from the DNS server to the request R-AAAA, if the network resource S targeted by this request has only IPv4 connectivity. In other words, the DNS server detecting the PREFIX64 option in the DNS request which is addressed to it is not required to apply the type of IP address defined by the latter if the network resource has dual IPv4 and IPv6 connectivity.

In another embodiment, care can be taken to define the PREFIX64 option (and therefore ensure that it is recognized as such by the DNS server receiving the DNS request containing this option) such that it is representative of the type of IP address expected by the client device from the DNS server interrogated in response to its request R-AAAA, when the network resource targeted by this request has IPv4 connectivity. In other words, the interrogated DNS server is required to apply the type of IP address defined by the PREFIX64 option if the network resource has IPv4 connectivity, and even if it has dual IPv4 and IPv6 connectivity.

Various particular cases can arise and impact the value of the piece of information inserted by the client device T into the PREFIX64 option of the DNS request.

More specifically, if the connection interface that the client device T considers using to access the network resource S is associated with a NAT64-ENABLED parameter set at 1 and with at least one NAT64 prefix (response "yes" to the test step E30), the client device T completes the PREFIX64 option with the value of the NAT64 prefix or the IPv6 address associated with the connection interface and determined in the step E10 (and stored in one of the (NETWORK-ID, PREFIX64) pairings maintained by the client device T and associated with the connection interface concerned) (step E40). By completing the PREFIX64 option of the request R-AAAA in this way, the client device T indicates to the server DNS #2 that if the network resource S has IPv4 connectivity, and consequently the resolution of the domain name associated with this network resource S results in an IPv4 address being obtained, the client device T wants to receive from the server DNS #2 an IPv6 address formed by the latter from the IPv4 address of the network resource S and the NAT64 prefix completed in the PREFIX64 option, or, if this option contains an IPv6 address, the NAT64 prefix extracted from this IPv6 address, for example by using the algorithm described in the document RFC 6052 mentioned previously.

If, on the contrary (response "no" to the test step E30), the connection interface that the client device T considers using to access the network resource S is associated with a NAT64-ENABLED parameter set at 0, the client device T sets, in the PREFIX64 option of the request R-AAAA, a predefined value, namely, here, the zero value "::ffff:0:0" (step E50). This zero value indicates to the server DNS #2 that the IP address expected in response to the request R-AAAA is an IPv4 address, in this case the IPv4 address of the resource S. The example of zero value given is provided purely for illustrative purposes: as a variant, it is possible to envisage another predefined value to indicate to the server DNS #2 that the IPv4 address of the resource S is expected in response to the request R-AAAA, when this predefined value is recognized as having this meaning by the server DNS #2.

Note that, advantageously, the client device T can also insert a zero value (or, more generally, a predefined value) into the PREFIX64 option if, although it has determined that the connection interface that it considers using allows access to a network which implements a NAT64 function, it wants to itself form an IPv6 address from the IPv4 address of the resource S (it is for example equipped for this purpose with a CLAT function described previously), and does not want to invoke the server DNS #2 to form this address, or if it is informed that the server DNS #2 does not implement the DNS64 function.

FIG. 6 illustrates a first format that can be envisaged for the PREFIX64 option inserted by the client device into the request R-AAAA.

This format comprises three fields:
an "Option Code" field including a code identifying the PREFIX64 option;
an "Option Length" field indicating, in octets, the size of the data included in the PREFIX64 option. In the embodiment described here, a data size equal to 16 has a particular meaning: that means that the PREFIX64 field contains an IPv6 address and not a NAT64 prefix; and
a PREFIX64 field containing the information representative of the type of IP address expected by the client device. In the embodiment described here, the PREFIX64 field can contain a NAT64 prefix, an IPv6 address or the zero value (that is to say, the value "::ffff:0:0").

FIG. 7 represents a second format that can be envisaged for the PREFIX64 option and that makes it possible to include one or more NAT64 prefixes (or IP addresses from which to extract NAT64 prefixes). The size of each prefix is governed by the "Prefix Length" field; if this field is set at 16, that means that the associated PREFIX64 field contains an IPv6 address and not a prefix. The "Option Length" field corresponds to the sum of the lengths of the different prefixes supplied in the PREFIX64 option.

Obviously these examples of formats are given purely by way of illustration and other information can be included in the PREFIX64 option.

Note that when the value of the PREFIX64 field includes a NAT64 prefix or an IPv6 address that makes it possible to extract such a NAT64 prefix, it should be the NAT64 prefix used if appropriate by the IP network associated with the connection interface that the client device T considers using to access the network resource S (that is to say, to send to it and/or receive data from this network resource). If the client device T considers using all its active connection interfaces and distinct NAT64 prefixes have been discovered for these different connection interfaces in the step E10, the client device T includes several PREFIX64 options in the request R-AAAA which each contain a NAT64 prefix, for example by using the option format proposed in FIG. 7. In a variant embodiment, the client device T can send several DNS requests to the server DNS #2 each containing a PREFIX64 option identifying a distinct NAT64 prefix.

Note also that a client device T which has several active connection interfaces, in other words a multi-interface client device, can choose any one of its active connection interfaces to send a AMA request conveying a PREFIX64 option. For example, the terminal can send the request AMA via the same network which supports the NAT64 service associated with the NAT64 prefix or prefixes included in the request AMA or via a different network.

After having inserted the PREFIX64 option into the DNS request R-MM, the client device T sends the request R-MAA to the server DNS #2 via one of its active connection interfaces (step E70).

In another embodiment, the PREFIX64 option is defined to be representative generally of the type of IP address expected by the client device from the DNS server in response to its request R-AMA when the network resource has at least one IPv4 connectivity, and the client device T inserts into its DNS request R-AMA, in addition to the PREFIX64 option and before sending it to the server DNS #2, an additional instruction aiming to indicate to the server DNS #2, when the PREFIX64 option contains an IPv6 prefix or an IPv6 address comprising such a prefix, whether it must generate an address according to the IPv6 format from this prefix and from the IPv4 address of the resource only if the network resource has only IPv4 connectivity, or if the network resource has IPv4 connectivity independently of the fact that it has or does not have also IPv6 connectivity. This instruction can be contained in an optional parameter of the DNS request R-MAA (for example in a field of the PREFIX64 option represented by way of illustration in FIGS. 6 and 7, that can be called "Scheme ID"), intended to communicate to the DNS server indications relating to the method that the DNS server must apply to form "fake" IPv6 addresses from the IPv4 addresses of the network resources for which it is interrogated. If "Scheme ID" is used to designate this optional parameter, it is for example possible to define the following values for this parameter:

the value 0 indicates that the DNS server must generate the fake IPv6 addresses only if the network resource has only IPv4 connectivity; and the value 1 indicates that the DNS server must generate the fake IPv6 addresses if the network resource has IPv4 connectivity, even if it also has IPv6 connectivity.

Note that other values can be defined for the Scheme ID parameter to transmit to the DNS server other types of instructions concerning the method for forming the fake IPv6 addresses. As an illustration:

the value 2 can indicate that the DNS server must use to form fake IPv6 addresses from IPv4 addresses and according to the algorithm defined in section 2.3 of the document RFC 6052;

the value 3 can indicate that the DNS server must use the WKP prefix to form fake IPv6 addresses from IPv4 addresses;

the value 4 can indicate that the DNS server must use a suffix which guarantees the neutrality of the "checksum" (integrity checking mechanism) of the pseudo-header of the transport layer; and the value 5 can indicate that the DNS server must return IPv4 addresses associated with the target resource in the additional section.

These examples are given by way of illustration and it is possible to envisage the client device transmitting to the DNS server other instructions via other values of the "Scheme ID" parameter. As a variant, other instructions can be transmitted by the client device to the DNS server via other media, such as, for example, other parameters of the request R-AAAA.

There now follows a description, with reference to FIG. 8, of how the DNS requests of type AMA transmitted by the client device T, and notably the request R-MM, are processed by the server DNS #2 or more generally by the DNS servers that conform to the invention.

On reception of a DNS request of type AMA via its reception module M4 (step F10), the server DNS #22 checks, by means of its detection module M5, whether this request contains a PREFIX64 option (test step F20).

If the detection module M5 does not detect a PREFIX64 option (response "no" to the test step F20), it processes and resolves the DNS request of type MAA in the conventional way, as in the state of the art (step F30). The mechanism implemented for this resolution is for example described in the IETF documents RFC 1034 and RFC 1035, respectively entitled "Domain names—concept and facilities" and "Domain names—implementation and specification", November 1987.

More specifically, the server DNS #22 determines, by means of its module M6, the IPv6 address of the network resource S. Hereinafter this IP address is denoted @IP(S).

If the server DNS #2 is the authority DNS server for the resource S, and if the resource S has IPv6 connectivity, the server DNS #2 locally has the IPv6 address of the resource S, and responds to the client device T positively by transmitting this IPv6 address to it. If it is not the authority DNS server for the resource S but a recursive DNS server, the server DNS #2 transmits to the authority DNS server (or another recursive DNS server) a DNS request of type AMA aiming to obtain the IPv6 address of the resource S. If the resource S has IPv6 connectivity, a positive response is returned to the server DNS #2 containing the IPv6 address of the resource S. The server DNS #2 then responds positively to the client device T by transmitting this IPv6 address to it in its response to the request R-AAAA. Otherwise, a negative response is returned to the server DNS #2 which, in turn, responds negatively to the DNS request AAAA received from the client device T.

In the example considered here, the server DNS #2 receives, in the step F10, the request R-MAA concerning the network resource S, and into which the client device T has inserted a PREFIX64 option representative of the type of IP address that it expects in response to its DNS request if the network resource S has IPv4 connectivity (and only such connectivity in the embodiment described here). The detection module M5, in the step F20, detects the presence of the PREFIX64 option inserted by the client device T into the request R-AMA (response "yes" to the test step F20).

It extracts the value entered by the client device T in the PREFIX64 field of the detected option (step F40).

Then it determines, by means of its obtaining module M6, the IP address @IP(S) of the network resource S (step F50). As described previously for the step F30, if the server DNS #2 is the authoritative server for the resource S, it locally has the IP address or IP addresses thereof whether they be IPv4 addresses or IPv6 addresses or both types of addresses. Otherwise, it obtains the IP address of the resource S recursively by interrogating the authoritative server DNS of the resource S.

More specifically, it transmits to the authoritative DNS server (directly or via an intermediate recursive DNS server) a DNS request of type AMA aiming to obtain an IPv6 address for the resource S. If the resource S has IPv6 connectivity, a positive response is then returned by the authoritative DNS server to the server DNS #2 containing the IPv6 address of the resource S denoted @IPv6(S).

Otherwise, a negative response is returned to the server DNS #2. In this case, in the embodiment described here, the server DNS #2 transmits to the authoritative DNS server (or another intermediate recursive DNS server) a DNS request of type A aiming to obtain the IPv4 address of the resource S. It then receives a positive response from the authoritative DNS server containing the IPv4 address of the resource S denoted @IPv4(S).

Note that the server DNS #2 can, as a variant, transmit both type A and type AMA DNS requests simultaneously to the authoritative DNS server to anticipate in particular the absence of support of IPv6 connectivity by the network resource S. The response to the request of type A is then used by the server DNS #2 only if the response to the request of type AAAA is negative.

In yet another variant, if the PREFIX64 option is defined such that it is taken into account including when the network resource S has dual connectivity or when the DNS request R-MAA comprises an instruction in this regard (for example a Scheme ID parameter as mentioned previously, set at 1), the server DNS #2 can transmit both type A and AMA DNS requests simultaneously or sequentially to the authoritative DNS server to determine whether the resource S has dual IPv4 and IPv6 connectivity.

If the address @IP(S) thus determined by the server DNS #2 is an address @IPv6(S) that conforms to the IPv6 protocol (response "yes" to the test step F60), the server DNS #2 responds positively to the request R-MAA from the client device T by sending to it the address @IPv6(S) (step F70). In other words, the address @IPv6(S) is sent to the client device T in the response to the request R-AAM, this response bearing the type MM in accordance with the procedure described in section 2.3 of the document RFC 3596 cited previously.

Otherwise, that means that the network resource S has only IPv4 connectivity, and does not have IPv6 connectivity.

The server DNS #2 then examines the value extracted from the PREFIX64 option inserted into the request R-AMA by the client device T (step F80).

If the extracted value is equal to "::ffff:0:0" (in other words to the prefix defining the zero value) (branch (1) at the output of the step F80), that means that the client device T wants to receive the address @IPv4(S) of the network resource S in accordance with the IPv4 protocol (i.e. according to the IPv4 format and not embedded in an IPv6 address for example), to proceed itself with the formation of an IPv6 address from this IPv4 address, for example by using a CLAT function as described previously.

The server DNS #2 then responds to the request R-MAA from the client device T, via its sending module M7, by sending to it the address @IPv4(S) of the network resource S (step F90). In other words, the address @IPv4(S) is sent to the client device T in the DNS response to the request R-AMA, this response bearing the type AMA as described in the document RFC3596 cited previously. The address @IPv4(S) can be included in the DNS response in the additional section ("Additional Section", described notably in section 3.7 of the document RFC 1034) of the DNS response (the address is then coded as is, in its original IPv4 format) or in the body of the response. Note that if the body of the response is chosen to transmit the address @IPv4(S) to the client device T, the address @IPv4(S) is coded in the form of an IPv6 address constructed, for example, by using the known prefix "::ffff:0:0/96" (also called "IPv4-mapped" IPv6 address and described in the document RFC 4291). As a variant, other formats can be envisaged for coding the address @IPv4(S).

It should be noted that it is equivalent for the client device T, if it wants to obtain the IPv4 address of the network resource S when the latter benefits from IPv4 connectivity, to transmit in its DNS request a PREFIX64 option set with the known prefix "::ffff:0:0/96" and a PREFIX64 option set with the zero value.

Thus, as an illustration, if the address @IPv4(S) ="198.51.100.1" and the PREFIX64 option inserted into the DNS request R-AAAA has the zero value "::ffff:0:0", the server DNS #2 can send to the client device T a response to its DNS request containing, in the body of the DNS response, the address @IP(S)="::ffff:0:0:198.51.100.1" containing the address @IPv4(S).

If the value extracted from the PREFIX 64 option contains a non-zero IPv6 address (branch (2) at the output of the step F80), the server DNS #2 executes the algorithm described in the document RFC 6052 to extract the NAT64 prefix from which this IPv6 address was formed (step F100). It then uses the duly extracted NAT64 prefix to form an IPv6 address for the network resource S from its address @IPv4 (S) (step F110). It then responds to the request R-AAAA from the client device T by sending to it, via its sending module M7, the address @IPv6(S) thus formed for the network resource S (step F120). Note that a conventional DNS response to a DNS request AAAA can be used for this purpose.

If the value extracted from the PREFIX 64 option contains a NAT64 prefix (branch (3) at the output of the step F80), the server DNS #2 directly executes the steps F110 and F120 without implementing the step F100.

The server DNS #2 forms the address @IPv6 for the network resource S from its address @IPv4(S) by taking account of the instructions transmitted if appropriate by the client device T relating to the method for forming IPv6 addresses which must be applied. Such instructions can be transmitted, as explained previously, in the DNS request R-AAAA via a parameter defined for that purpose such as the Scheme ID parameter described previously. If no instruction is defined by the client device T in the DNS request, the server DNS #2 can apply a method for forming IPv6 addresses configured by default (for example execution of the algorithm defined in the document RFC 6052 and do so only in the case of absence of AAAA records).

If an embodiment is considered in which the server DNS #2 is configured to apply the type of IP address contained in the PREFIX64 option when the resource S has at least IPv4 connectivity, the response from the server DNS #2 to the client device T can furthermore contain several IP addresses if the network resource S has dual IPv4 and IPv6 connectivity. It will be recalled that the configuration of the server DNS #2 can result from the very definition of the PREFIX64 option or from an instruction from the client device T inserted in the DNS request R-AAAA as mentioned previously (for example in the Scheme ID parameter). The plurality of IP addresses then obtained by the server DNS #2 (which then comprises at least one IPv4 address and one IPv6 address of the resource) can all be inserted into the body of the response (according to the IPv6 format, including the fake IPv6 addresses constructed from the IPv4 addresses), or all inserted into the additional section of the DNS response (the IPv4 addresses as such can then be coded according to the IPv4 format), or be inserted into the addresses encoded according to the IPv6 format in the body of the response and, for the others, in the additional section of the DNS response.

Note that, according to the connection interface used by the client device T to access the network resource S, the IP address (or the IP addresses) returned by the server DNS #2 to the client device T in response to its request AAAA may differ. Thus, two client devices T1 and T2 transmitting to the server DNS #2 DNS requests of type AMA targeting a network resource "myT3.name.example" which has only IPv4 connectivity (@IPv4(S)="198.51.100.1"), and each comprising a PREFIX64 option set respectively to "2001:db8:1234::/96" for T1 and to "64:ff9b::/96" for T2, will receive from the server DNS #2:

for the client device T1: a DNS response comprising the IPv6 address "2001:db8:1234::198.51.100.1"; and for the client device T2: a DNS response comprising the IPv6 address "64:ff9b::198.51.100.1". Thus, the IPv6 addresses returned by the server DNS #2 to the client devices T1 and T2 for one and the same network resource are not necessarily identical. From these IPv6 addresses, the client devices T1 and T2 can set up communications with the network resource S, each of these communications transiting through the NAT64 function of the IP network to which each client device is connected, that is to say through the NAT64 function configured with the prefix "2001:db8:1234::/96" for T1 and through the NAT64 function configured with the prefix "64:ff9b::/96" for T2.

Referring once again to FIG. 5, on reception of the DNS response from the server DNS #2 to its request R-MAA (step E70), the client device T extracts the IP address @IP(S) supplied in the response for the network resource S, in order to use it to access the resource S (step E80).

If the client device T had included in its request R-AMA a zero or predefined value in the PREFIX64 option, it uses the address @IP(S) returned by the server DNS #2 to locally construct a fake IPv6 address of "IPv4-converted IPv6" type for the network resource S, on the basis of a local NAT64 prefix with which it was previously configured. This NAT64 prefix is that discovered in the step E10 by the client device T for the IP network that it considers using to access the resource S. Then, the client device T uses the fake IPv6 address that it has constructed locally as destination address for the packets sent to the network resource S.

Otherwise, the client device T uses the address @IPv6(S) returned by the server DNS #2 as such as destination address for the packets sent to the network resource S.

Note that a multi-interface client device T must select the connection interface to be used to send data packets to the network resource S based on the IP address returned by the server DNS #2. In fact, if the client device T has several {NETWORK-ID, PREFIX64} pairings, then the client device T selects the NETWORK-ID connection interface whose NAT64 prefix corresponds to the first bits of the IPv6 address returned by the server DNS #2. For example, if the client device T has two connection interfaces {NETWORK-ID=WLAN, PREFIX64=2001:db8:1234/96} and {NETWORK-ID=RMNET, PREFIX64=64:ff9b::/96}, the connection interface to be used to send the data to an address "64:ff9b::1.2.3.4" returned by the server DNS #2 is the connection interface RMNET.

Furthermore, if several NAT64 prefixes are supplied in the request R-AAAA by the client device T to the server DNS #2 corresponding to distinct connection interfaces of the client device T (for example the prefix "2001:db8:1234/96" for the network NW1 and the prefix "64:ff9b::/96" for the network NW2), the server DNS #2 transmits as many IPv6 addresses as prefixes in response to the client device T (in the example considered, an address "2001:db8:1234::198.51.100.1" and an address "64:ff9b::198.51.100.1"). The client device T must then use the IPv6 address corresponding to the prefix associated with the connection interface chosen to send packets to the network resource, in other words the destination address "2001:db8:1234::198.51.100.1" for the packets sent via the network NW1 and the address "64:ff9b::198.51.100.1" for the packets sent via the network NW2.

The selection of the wrong connection interface can have implications on the quality of experience. In fact, the choice of the prefix or prefixes to be communicated to the DNS server allows the client devices to control how a communication will be set up to a remote network resource.

As an illustration, referring to the example of FIG. 9, if the PREFIX64 option contains the prefix "2001:db8:1234/96", then the data must be exchanged via the network NW1. Note that any data packet having as destination address "2001:db8:1234::198.51.100.1" but transmitted via the network NW2 is rerouted to the network NW1 (because this network advertises the prefix "2001:db::/32") and risks being rejected by this network because the NAT64 service is not provided on the interface visible from the Internet network.

Referring to the example of FIG. 10, if the DNS response contains the prefix "64:ff9b::/96", then the data must be exchanged via the network NW2. Any data packet having as destination address "64:ff9b::198.51.100.1" and transmitted via the network NW1 is rejected by the network NW1 because this network does not have any route (for example any BGP (Border Gateway Protocol) route) to route the packet.

In the embodiment described previously, the PREFIX64 option is inserted by the client device T into its request R-AAAA. In another embodiment in which the client device T communicates with the IP networks via a CPE, the PREFIX64 option can be inserted by the CPE. The obtaining method according to the invention is then implemented by the CPE (which is then considered as a client device within the meaning of the invention). More specifically, if the CPE detects the presence of a NAT64 function in an IP network, then, on reception of a DNS request AAAA from an equipment of the local area network to which the CPE is connected, the CPE modifies the request to include a PREFIX64 option according to the modalities which have just been described.

Moreover, in the embodiment described, it is the alternative DNS server DNS #2 which implements the processing method according to the invention. It should be noted that the invention applies also to the nominal DNS servers, when the client device T is configured to address its DNS requests to these nominal DNS servers.

The invention claimed is:

1. A method comprising:
    implementing by a client device to obtain an Internet Protocol (IP) address in order to access a first network resource associated to a domain name and having IPv4 connectivity via at least one network providing an IP connectivity service to said client device, said client device having only IPV6 connectivity:
    determining whether said network implements a function for converting IPv4 packets into IPv6 packets;
    inserting, into a first request, requesting for the first network resource a record of AAAA type, to obtain an IPV6 address in order to access said first network resource, intended for a domain name server (DNS server), the domain name associated with the first network resource and an additional piece of information specifying a type of IP address of the first network resource expected by said client device from said DNS server in response to said first request, said expected type of IP address being able to be an IPV4 address of the first network resource or a fake IPV6 address of the first network resource; and sending said first request to said DNS server, wherein:

the DNS server is a server distinct from a "nominal" DNS server with which the client device has been configured by an operator of the network;

the determining comprises sending, to the nominal DNS server, a second request to obtain an IPV6 address in order to access a given second network resource known to have only IPv4 connectivity; and if a positive response is received from the nominal DNS server comprising an IPV6 address for said given second network resource, the client device determines that the network implements the function for converting IPv4 packets into IPv6 packets.

2. The method as claimed in claim 1, wherein said piece of information inserted into the first request comprises at least one IPv6 prefix or at least one IPv6 address comprising at least one IPV6 prefix, if said expected IP address type is an IPV6 address formed by the DNS server from said at least one IPV6 prefix and an IPV4 address of said first network resource.

3. The method as claimed in claim 2, wherein said at least one IPV6 prefix is at least one IPV6 prefix used by a function for converting IPv4 packets into IPV6 packets implemented by said network.

4. The method as claimed in claim 2, wherein the first request further comprises:
an instruction to form said IPV6 address only if the first network resource has only IPv4 connectivity; or
an instruction to form said IPV6 address if the first network resource has IPv4 connectivity even if it also has IPv6 connectivity.

5. The method as claimed in claim 1, wherein said expected IP address type is an IPV4 address of said first network resource and said piece of information inserted into the first request is a predefined value, known to the DNS server.

6. The method as claimed in claim 1, wherein the first request further comprises:
an instruction to execute a determined algorithm to form an IPV6 address from an IPv4 address of the first network resource; and/or
an instruction to use a WKP (Well-Known Prefix) prefix to form an IPV6 address from an IPV4 address of the first network resource; and/or
an instruction to use a suffix which guarantees neutrality of a mechanism for checking integrity of a pseudo-header of a transport layer; and/or
an instruction to insert an IPV4 address into an additional section of a response to the first request.

7. The method as claimed in claim 1, further comprising, if said network implements a function for converting IPv4 packets into IPv6 packets, obtaining at least one IPv6 prefix used by said packet conversion function.

8. The method as claimed in claim 1, comprising obtaining an IPV6 prefix used by said function for converting IPV4 packets into IPv6 packets from the IPV6 address contained in the positive response received from the nominal DNS server.

9. A processing method, implemented by a domain name server (DNS server) associated with a network supplying an Internet protocol (IP) connectivity service to at least one client device, said method comprising:

receiving, from said client device, a first request requesting for a first network resource a record of AAAA type to obtain an IPV6 address in order to access the network resource, the first network resource being associated to a domain name and having IPv4 connectivity, and in which there is inserted the domain name associated with the first network resource and an additional piece of information specifying a type of IP address of the first network resource expected by said client device from said DNS server in response to said first request if said first network resource has IPv4 connectivity, said expected type of IP address being able to be an IPv4 address of the first network resource or a fake IPV6 address of the first network resource, and wherein the client device has only IPv6 connectivity;

obtaining an IPV4 address of said first network resource; and sending a response to said first request containing at least one IP address determined by the DNS server from said IPv4 address obtained and corresponding to the type of IP address expected by the client device, wherein the DNS server is a server distinct from a "nominal" DNS server with which the client device has been configured by an operator of the network, and wherein said piece of information inserted into the first request has a predefined value known to the DNS server, and said at least one IP address determined by the DNS server is the IPV4 address of the first network resource obtained.

10. The processing method as claimed in claim 9, wherein said IPv4 address is sent by the DNS server to the client device in a body of the response, coded according to the IPV6 format by using the prefix "::ffff:0:0/96".

11. The processing method as claimed in claim 9, wherein the sending and the obtaining are implemented by the DNS server only if the first network resource has only IPv4 connectivity.

12. A client device connected to at least one network supplying an IP connectivity service to the client device, said client device comprising:
a processor; and
a non-transitory computer readable medium storing computer-executable instructions which when executed by the processor configure the client device to:
determining whether said network implements a function for converting IPv4 packets into IPv6 packets;
insert, into a first request requesting for a first network resource a record of AAAA type to obtain an IPV6 address in order to access the first network resource, the first network resource being associated to a domain name and having IPv4 connectivity via said network, intended for a domain name server (DNS server), the domain name associated with the first network resource and an additional a piece of information specifying a type of Internet Protocol (IP) address of the first network resource expected by said client device from said DNS server in response to said first request, said expected type of IP address being able to be an IPV4 address of the first network resource or a fake IPV6 address of the first network resource, and wherein said client device has only IPV6 connectivity; and send said first request to the DNS server,
wherein:
the DNS server is a server distinct from a "nominal" DNS server with which the client device has been configured by an operator of the network;
the determining comprises sending, to the nominal DNS server, a second request to obtain an IPV6 address in order to access a given second network resource known to have only IPv4 connectivity; and
if a positive response is received from the nominal DNS server comprising an IPV6 address for said given second network resource, the client device determines that the network implements the function for converting IPv4 packets into IPv6 packets.

13. The client device as claimed in claim 12, wherein the instructions further configure the client device to translate IPv4 addresses into IPV6 addresses activated on reception of a response from the DNS server to said first request comprising an IPV4 address of said first network resource, said translating being configured to translate said IPv4 address into an IPV6 address by using said IPv4 address and an IPV6 prefix used by a function for converting IPv4 packets into IPV6 packets implemented by the network.

14. A domain name server (DNS server) comprising:
a processor; and
a non-transitory computer readable medium storing computer-executable instructions which when executed by the processor configure the DNS server to:
receive, from a client device connected to a network supplying an Internet Protocol (IP) connectivity service to said client device, a first request requesting for a first network resource a record of AAAA type to obtain an IPV6 address in order to access via said network the first network resource, the first network resource being associated to a domain name, and said client device having only IPV6 connectivity;
detect, in said first request, the domain name associated with the first network resource and an additional a piece of information specifying a type of IP address of the first network resource expected by said client device from said DNS server in response to said obtaining request if said first network resource has IPv4 connectivity, said expected type of IP address being able to be an IPV4 address of the first network resource or a fake IPV6 address of the first network resource;
if said first network resource has IPv6 connectivity, send, to the client device, in response to said first request, an IPV6 address of said first network resource; and
if said first network resource has IPv4 connectivity:
obtain an IPv4 address of the first network resource; and
send a response to said first request containing at least one IP address in order to access said first network resource determined by the DNS server from said IPv4 address obtained and corresponding to the type of IP address expected by the client device indicated by said piece of information inserted into said first request,
wherein the DNS server is a server distinct from a "nominal" DNS server with which the client device has been configured by an operator of the network, and
wherein said piece of information inserted into the first request has a predefined value known to the DNS server, and said at least one IP address determined by the DNS server is the IPV4 address of the first network resource obtained.

15. The domain name server as claimed in claim 14, wherein said DNS server is a public DNS server distinct from a so-called nominal DNS server with which the client device has been configured by an operator of said network.

16. The method as claimed in claim 1, wherein the method further comprises:
the client device choosing the type of IP address the client expects from the DNS server by performing the inserting of the piece of information into the first request and the sending of the first request to the DNS server.

17. The method as claimed in claim 1, wherein the piece of information that the client device inserts into the first request specifying the type of IP address is able to specify any one of an IPV4 address and a fake IPv6 address.

* * * * *